(12) United States Patent
Miyazaki et al.

(10) Patent No.: US 7,359,581 B2
(45) Date of Patent: Apr. 15, 2008

(54) OPTICAL WAVEGUIDE MODULATOR WITH OUTPUT LIGHT MONITOR

(75) Inventors: Norikazu Miyazaki, Funabashi (JP); Tokutaka Hara, Funabashi (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 11/633,777

(22) Filed: Dec. 4, 2006

(65) Prior Publication Data

US 2007/0076999 A1   Apr. 5, 2007

Related U.S. Application Data

(62) Division of application No. 09/980,606, filed on Nov. 15, 2001, now Pat. No. 7,200,289, which is a division of application No. PCT/JP01/02073, filed on Mar. 15, 2001.

(30) Foreign Application Priority Data

| Mar. 15, 2000 | (JP) | ............................. 2000-077819 |
| Mar. 31, 2000 | (JP) | ............................. 2000-101316 |
| Dec. 14, 2000 | (JP) | ............................. 2000-380629 |

(51) Int. Cl.
  *G02F 1/035*   (2006.01)
  *G02B 6/26*   (2006.01)
  *G02B 6/42*   (2006.01)

(52) U.S. Cl. .................. 385/3; 385/2; 385/48; 385/49; 385/50; 359/245

(58) Field of Classification Search ............ 385/2, 385/3, 48–50
See application file for complete search history.

(56) References Cited

U.S. PATENT DOCUMENTS 4,340,272 A   7/1982   Papuchon et al.

(Continued)

FOREIGN PATENT DOCUMENTS

JP   55-59785   5/1980

(Continued)

OTHER PUBLICATIONS

Patent Abstracts of Japan for Publication No. 55-059785; Date of publication of application May 6, 1980 in the name of Seiji Terai et al.

(Continued)

*Primary Examiner*—Frank G. Font
*Assistant Examiner*—Erin D Chiem
(74) *Attorney, Agent, or Firm*—Christie, Parker & Hale, LLP

(57) ABSTRACT

An optical waveguide monitor equipped with an output light monitor having a decreased restriction in the dimensions and form thereof, a high reliability and a low production cost includes an optical waveguide element (having a plurality of surface waveguide portions, a connecting portion for converging and connecting the surface waveguide portions and an output light-outputting waveguide portion connected to the connecting portion each formed on a dielectric substrate plate; an output light optical fiber connected to an output end of the output light-outputting waveguide portion, a reinforcing capillary for reinforcing a connection between the optical waveguide element and the output light optical fiber and a monitoring light receiving means, wherein the reinforcing capillary has a hole or groove for containing and supporting the output light optical fiber therein, a connecting face thereof bonded to an output end face of the substrate, and a terminal surface opposite to the connecting face, to thereby enable at least one member of the reinforcing capillary per se and a monitoring light optical fiber located within the capillary to receive the monitoring light outputted from the optical waveguide element, to transmit it therethrough and to output it to the outside of the capillary, and the monitoring light receiving means is located in a position suitable to receive the monitoring light outputted to the outside of the reinforcing capillary and has a photoelectric conversion element.

8 Claims, 20 Drawing Sheets

U.S. PATENT DOCUMENTS

| | | | |
|---|---|---|---|
| 4,768,848 | A | 9/1988 | Vaerewyck |
| 4,878,728 | A | 11/1989 | Mannschke |
| 5,042,895 | A | 8/1991 | Chouinard et al. |
| 5,259,044 | A * | 11/1993 | Isono et al. .................... 385/2 |
| 5,280,550 | A * | 1/1994 | Parriaux et al. .............. 385/50 |
| 5,764,400 | A | 6/1998 | Itou et al. |
| 5,796,764 | A | 8/1998 | Corsini et al. |
| 5,963,357 | A | 10/1999 | Kubota et al. |
| 6,421,483 | B1 | 7/2002 | Hajjar |
| 6,795,620 | B2 | 9/2004 | Tavlykaev et al. |
| 2003/0103708 | A1 | 6/2003 | Galstian et al. |
| 2003/0147591 | A1 | 8/2003 | Doi et al. |

FOREIGN PATENT DOCUMENTS

| | | |
|---|---|---|
| JP | 55-126208 | 9/1980 |
| JP | 55-134818 | 10/1980 |
| JP | 60-63822 | 5/1985 |
| JP | 1-267515 | 10/1989 |
| JP | 2-165117 | 6/1990 |
| JP | 2-291518 | 12/1990 |
| JP | 3-145623 | 6/1991 |
| JP | 03145623 A * | 6/1991 |
| JP | 4-24610 | 1/1992 |
| JP | 5-34650 | 2/1993 |
| JP | 5-53086 | 3/1993 |
| JP | 5-100194 | 4/1993 |
| JP | 5-134220 | 5/1993 |
| JP | 5-346395 | 12/1993 |
| JP | 9-79861 | 3/1997 |
| JP | 11-194237 | 7/1999 |

OTHER PUBLICATIONS

Patent Abstracts of Japan for Publication No. 55-126208; Date of publication of application Sep. 29, 1980, in the name Yosuki Furuta et al.

Partial Translation of Japan Application No. 58-154,514, Publication No. 60-63822, Publication date May 4, 1985, in the name of Yokogawa Hokushin Denki K.K.

Patent Abstracts of Japan for Publication No. 01267515; Date of publication of application Oct. 25, 1989, in the name of Naoyuki Mekata et al.

Patent Abstracts of Japan for Publication No. 02165117; Date of publication of application Jun. 26, 1990, in the name of Takeo Iwama et al.

Patent Abstracts of Japan for Publication No. 02-291518; Date of publication of application Dec. 3, 1990, in the name of Sadao Fujita et al.

Patent Abstracts of Japan for Publication No. 03145623; Date of publication of application Jun. 20, 1991, in the name of Kiyono Minoru et al.

EPO Patent Abstracts of Japan for Publication No. 04024610; Publication Date Jan. 28, 1992, in the name of Takashi Yamane.

Patent Abstracts of Japan for Publication No. 05-053086; Date of publication of application Mar. 3, 1993, in the name of Kiyono Minoru et al.

Patent Abstracts of Japan for Publication No. 05100194; Date of publication of application Apr. 23, 1993, in the name of Hideaki Hanaoka.

Patent Abstracts of Japan for Publication No. 05-134220; Date of publication of application May 28, 1993, in the name of Hisashi Takamatsu et al.

Patent Abstracts of Japan for Publication No. 05346395, Date of publication of application Dec. 27, 1993, in the name of Koji Yamamoto.

Patent Abstracts of Japan for Publication No. 09079861; Date of publication of application Mar. 28, 1997, in the name of Shigeru Nakamura et al.

Patent Abstracts of Japan for Publication No. 11-194237; Date of publication of application Jul. 21, 1999, in the name of Funahashi Masaaki.

International Search Report, dated Apr. 12, 2001, for International Application No. PCT/JP01/02073, Publication Date Mar. 15, 2001, in the name of Yamada et al.

EPO Search Report, dated Sep. 15, 2003, for Application No. 01912411.4, in the name of Sumitomo Osaka Cement Co., Ltd.

EPO Search Report, dated Jun. 6, 2003, for Application No. 01912411.4, in the name of Sumitomo Osaka Cement Co., Ltd.

Japan Patent Office action issued Jun. 8, 2004 for corresponding Japan Patent Application 2000-030254.

N. Mekada et al., "Practical method for waveguide-to-fiber connection: direct preparation of waveguide endface by cutting machine and reinforcement using ruby beads"; Applied Optics, vol. 29, No. 34, Dec. 1, 1990, pp. 5096-5102.

N. Miyazaki, et al., "$LiNbO_3$ Optical Intensity Modulator Packages with Monitor Photodiode"; IEEE Photonics Technology Letters, vol. 13, No. 5, May 2001, pp. 442-444.

* cited by examiner

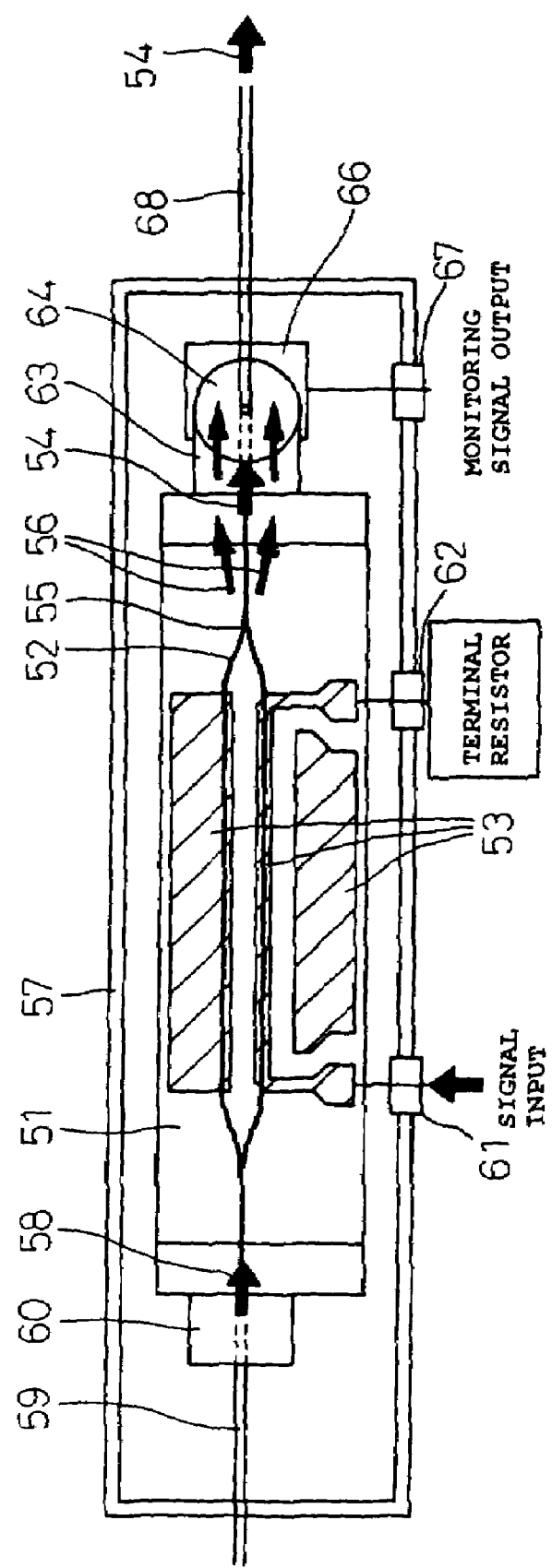

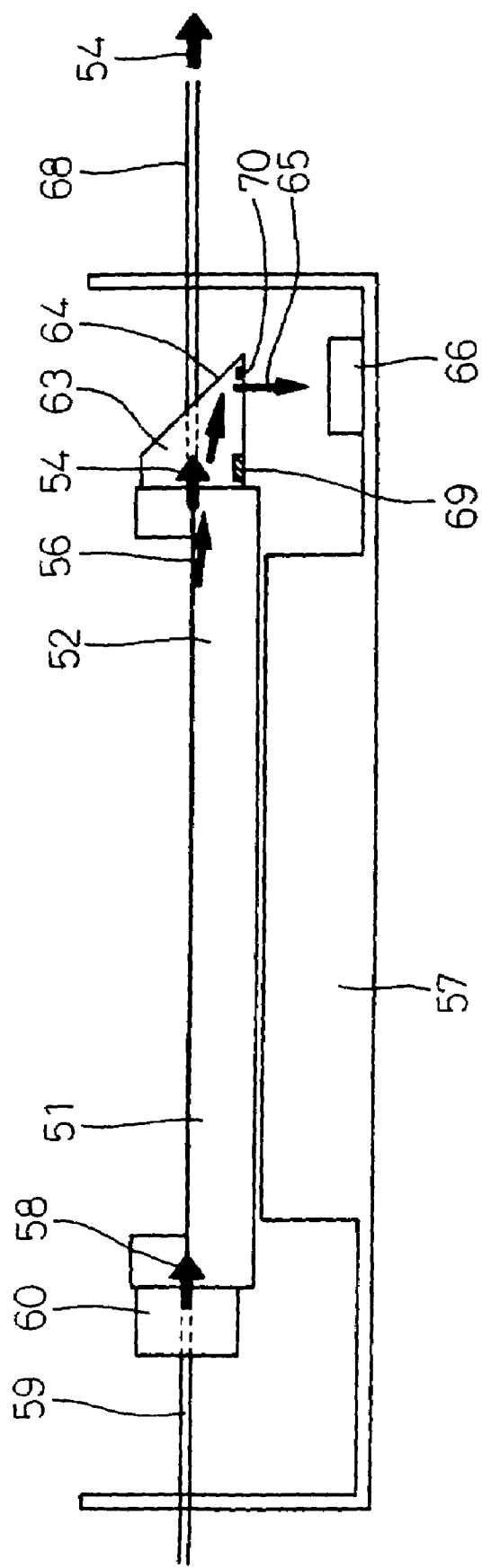

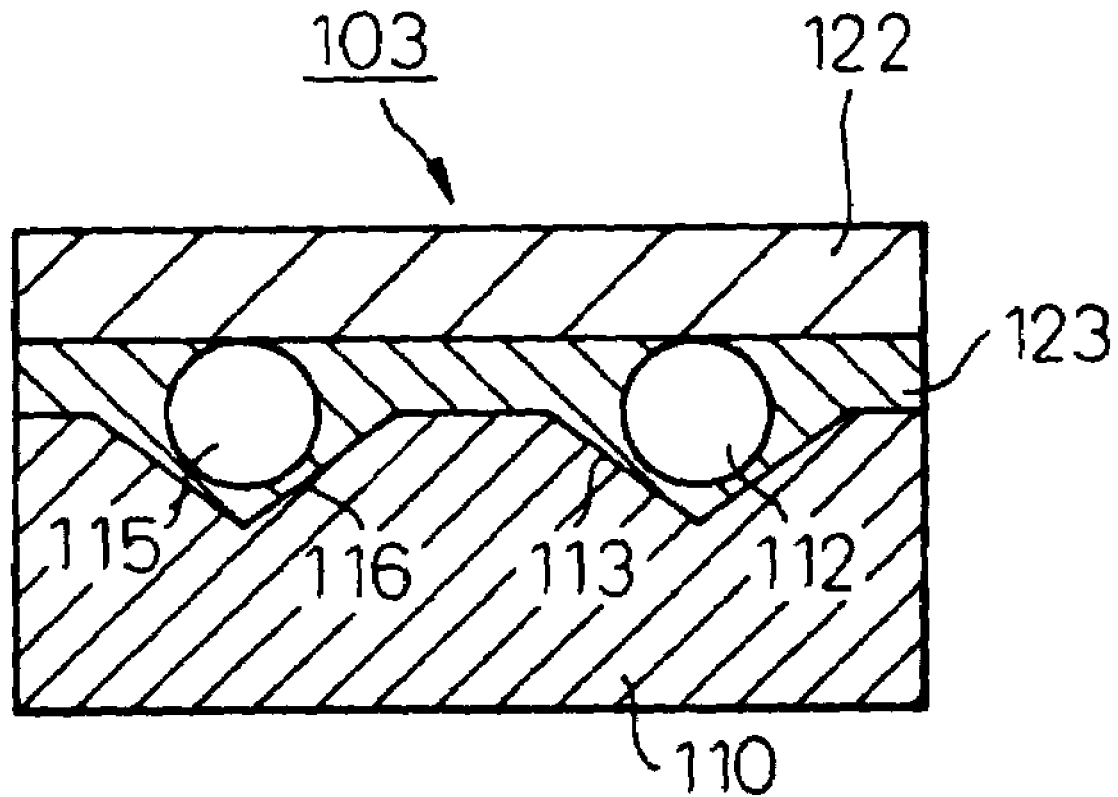

OPTICAL WAVEGUIDE MODULATOR WITH OUTPUT LIGHT MONITOR

CROSS-REFERENCE TO RELATED APPLICATION(S)

This application is a divisional of U.S. application Ser. No. 09/980,606 filed Nov. 15, 2001 now U.S. Pat. No. 7,200,289, which is a national stage filing of PCT application PCT/JP01/02073, filed on Mar. 15, 2001, which in turn relies on the priority of the Japanese priority patent application, No. JPN 2000-380629 filed Dec. 14, 2000, priority of each of which is claimed herein and the content of all of which are incorporated herein by reference.

TECHNICAL FIELD

The present invention relates to an optical waveguide modulator equipped with an output light monitor. More particularly, the present invention relate to an optical waveguide modulator, equipped with an output light monitor, usable for modulating an external light intensity in the optical communication field, and capable of monitoring output light by utilizing monitoring light radiated or outputted from an optical waveguide, and controlling the working point in the modulation of light intensity by feeding-back the monitoring results.

BACKGROUND ART

An optical waveguide modulator, in which an optical waveguide is formed on a substrate plate comprising $LiNbO_3$ (which may be referred to as LN hereinafter) or GaAs, is advantageous in that the working velocity is high, the dependency on wavelength is low and the driving voltage is low, and thus it is widely used for practical external modulators in the optical communication field. Particularly, an optical waveguide modulator is widely used in DWDM system in which the low wavelength-dependency thereof is advantageously utilized.

However, in the optical waveguide modulator, a drift in the working point voltage, which is referred to as a temperature drift or a DC drift, occurs. Due to this phenomenon, it becomes necessary that output light from the modulator is monitored and the monitored output is fed back to the working point voltage to maintain the working point in a particular one point on a particular characteristic curve even when the drift phenomenon occurs.

As a means for monitoring the output light of the modulator, a monitoring system in which an optical fiber for output light is connected to an optical coupler located outside of the modulator module, the outputted light is divided into a main signal light and a branch light for monitoring at the optical coupler, the monitoring branch light is converted to electric signal by a photoelectric conversion element, and DC voltage of the modulator is controlled in accordance with the electric signal, is known. In this system, however, there is the problem that since the optical coupler for providing the monitoring branched light and the photoelectric conversion elements must be arrange outside of the modulator module, the cost of the modulator system increases, limitations on the dimension and form of the system increase and the reliability of the system decreases.

As another means for monitoring the output light from the optical waveguide element, a system in which a coupler, particularly a directional coupler is arranged in the optical waveguide element and an output light waveguide portion for the monitoring light is provided in addition to a optical signal-outputting waveguide portion, is usually, utilized. In this system, an optical circuit for the branched monitoring light must be arranged in the optical waveguide element and an optical fiber for the monitoring output light, in addition to the optical fiber for the output light for signal, must be connected to the optical waveguide element.

As still another monitoring system, a system in which, as disclosed in Japanese Unexamined Patent Publication No. 11-194,237, an inclined hole is formed in a cladding portion on an optical waveguide, or a diffraction lens is arranged above an optical waveguide element, and a portion of output signal light in the optical waveguide is taken to the outside of the substrate plate of the element by the above-mentioned hole or lense, is known. In this system, installation of a lens etc. for taking the monitoring light out of the optical waveguide element is necessary and, as the monitoring light is taken out of the optical waveguide element, a member for receiving the monitoring light must be installed on the optical waveguide element after the element is fixed in a container case, and this installation is difficult and complicated.

Further, Japanese Unexamined Patent Publication No. 5-34,650 discloses a system in which an end of an optical waveguide element is formed into an inclined form, a portion of output light from the waveguide is reflected on the end of the element in an inclined direction, and the reflected light is received as a monitoring light. In this system, the inclined end form of the element must be determined to an extent such that the inclined end does not affect the main output light from the element, and thus there is a problem in practical utilizability of this system.

Japanese Unexamined Patent Publication No. 5-53086 discloses an optical device in which a light-receiving element is directly arranged on an optical waveguide element so that a portion of the output signal light from the optical waveguide can be directly received and monitored by the light receiving element. In this device, a means for fixing the light-receiving element must be installed on the optical waveguide element and since the fixing means-installation work, a work for connecting the fixing means to the light-receiving element and an operation for adjusting the connected light-receiving element are effected after the optical waveguide element is fixed to a container case, the above-mentioned works and operation are very difficult and the possibility of damaging the optical waveguide element by the above-mentioned works and operation is high.

DISCLOSURE OF THE INVENTION

An object of the present invention is to provide an optical waveguide modulator having an output light monitor to which the limitations in dimension and form are small and which is capable of monitoring the intensity of output light from the modulator by a monitoring means having a simple constitution with high reliability and with at low cost.

The above-mentioned object can be attained by the optical waveguide modulator equipped with an output light monitor of the present invention.

The optical waveguide modulator equipped with an output light monitor of the present invention comprises:

an optical waveguide element comprising a dielectric substrate and an optical waveguide formed on a front surface of the dielectric substrate, the optical waveguide comprising a plurality of surface optical waveguide portions, an optical waveguide connecting portion on which the surface optical waveguide portions are converged and connected to each other and an output light-outputting optical waveguide portion connected to the optical waveguide-connecting portion;

an optical fiber for output light, connected to an output end of the output light-outputting optical waveguide portion of the optical waveguide element;

a reinforcing capillary for reinforcing a connection between the optical waveguide element and the output light-outputting optical fiber; and a means for receiving monitoring light, wherein the reinforcing capillary is provided with a hole or groove formed therein for containing and holding the optical fiber for output light, a connection surface thereof connected to an output end side surface of the substrate of the optical waveguide element, and a terminal surface thereof opposite to the connection surface, to thereby enable the reinforcing capillary to receive the monitoring light outputted from the optical waveguide element through at least one member selected from the capillary itself and the optical fiber for the monitoring light located in the capillary, to transmit the monitoring light therethrough and to output the monitoring light to the outside of the capillary; and the monitoring light-receiving means is located in a position in which the monitoring light outputted from the reinforcing capillary to the outside of the capillary can be received, and is provided with a photoelectric conversion element.

In an embodiment (1) of the optical waveguide modulator equipped with an output light monitor of the present invention, the reinforcing capillary is formed from a light-transmitting material, to thereby enable radiation mode light generated in the optical waveguide connecting portion of the optical waveguide element to transmit through the dielectric substrate and to be received by the light-transmitting reinforcing capillary, and the radiation mode light outputted from the reinforcing capillary to be received, as monitoring light, by the monitoring light-receiving means.

In the embodiment (1) of the optical waveguide modulator equipped with an output light monitor of the present invention, preferably, the light-transmittable material for the reinforcing capillary is selected from transparent glasses.

In the embodiment (1) of the optical waveguide modulator equipped with an output light monitor of the present invention, preferably, the terminal surface of the reinforcing capillary formed from a light-transmittable material is a light-reflective surface, to thereby enable radiation mode light radiated from the optical waveguide connecting portion of the optical waveguide element to pass through the dielectric substrate of the optical waveguide element and the reinforcing capillary connected to the output end surface of the dielectric substrate, and to be reflected on the terminal light-reflective surface, and the reflected radiation mode light to be received, as a monitoring light, by the monitoring light-receiving means.

In an embodiment (1)-(a) of the optical waveguide modulator equipped with an output light monitor of the present invention, preferably, the reinforcing capillary is in the form of a cylinder.

In the embodiment (1)-(a) of the optical waveguide modulator equipped with an output light monitor of the present invention, preferably, the reinforcing capillary is a transparent glass cylinder; the hole or groove for holding the optical fiber for the output light is preferably formed along the longitudinal axis of the transparent glass cylindrical capillary; and the longitudinal axis of the hole or groove preferably intersects the light-reflective terminal surface at an oblique angle.

In the embodiment (1)-(a) of the optical waveguide modulator equipped with an output light monitor of the present invention, preferably, the radiation mode light reflected on the reflective terminal surface of the cylindrical reinforcing capillary is transmitted toward a periphery of the capillary and then is outputted, as a monitoring light through the periphery of the capillary, the outputted monitoring light is converged by a lens effect of the periphery of the cylindrical reinforcing capillary, and the converged monitoring light is received by the monitoring light-receiving means.

In the embodiment (1)-(a) of the optical waveguide modulator equipped with an output light monitor of the present invention, preferably, a light-reflective membrane is formed on the terminal surface of the reinforcing capillary.

In the embodiment (1)-(a) of the optical waveguide modulator equipped with an output light monitor of the present invention, preferably, the terminal surface of the reinforcing capillary is formed into a curved surface projecting outward to thereby enable the monitoring light passed through the reinforcing capillary to be reflected and converged on the curved terminal surface, and then to be received by the monitoring light-receiving means.

In the embodiment (1)-(a) of the optical waveguide modulator equipped with an output light monitor of the present invention, preferably, the connection surface of the reinforcing capillary is bonded to the optical waveguide element through an adhesive agent, and a first stain-preventing groove is formed on a portion of the bottom surface of the reinforcing capillary and close to the connection surface of the reinforcing capillary to thereby receive an excessive portion of the adhesive agent applied between the connection surfaces of the reinforcing capillary and the optical waveguide element and to prevent staining of the periphery of the reinforcing capillary through which the radiation mode light is outputted.

In an embodiment (1)-(a) of the optical waveguide modulator equipped with an output light monitor of the present invention, preferably, the optical fiber for the output light is bonded to the hole or groove of the reinforcing capillary through an adhesive agent, and a second stain-preventing groove is formed on a portion of the bottom surface of the reinforcing capillary and close to the light reflecting terminal surface of the reinforcing capillary, to thereby receive an excessive portion of the adhesive agent applied between the optical fiber and the hole or groove of the reinforcing capillary and to prevent staining of the periphery of the reinforcing capillary through which the radiation mode light is outputted.

In an embodiment (1)-(b) of the optical waveguide modulator equipped with an output light monitor of the present invention, preferably, the terminal surface of the reinforcing capillary formed from the light-transmitting material is provided with a surface portion in which the monitoring light is reflected and a non-monitoring surface portion, whereby when the radiation mode light radiated from the optical waveguide connection portion of the optical waveguide element through both side portions of the output light-outputting optical waveguide portion passes through the dielectric substrate of the optical waveguide element and the reinforcing capillary connected to the output end surface of the dielectric substrate, only a portion of the radiation mode light radiated to one side portion of the output light-outputting optical waveguide portion is reflected on the monitoring light-reflecting surface portion of the reinforcing capillary toward the monitoring light-receiving means, received as a monitoring output light by the monitoring light-receiving means, and another portion of the radiation mode light that reaches the non-monitoring surface portion is not received as a monitoring light by the monitoring light-receiving means.

In the embodiment (1)-(b) of the optical waveguide modulator equipped with an output light monitor of the present invention, preferably, the reinforcing capillary is in the form of a cylinder.

The optical waveguide modulator equipped with an output light monitor as claimed in claim 12, wherein the terminal reflecting surface portion of the reinforcing capillary intersects the direction of the longitudinal axis of the hole or groove in which the output light-outputting optical fiber is received, at an oblique angle, to thereby enable the radiation mode light reflected on the terminal reflecting surface portion to be received, as monitoring light, by the monitoring light-receiving means.

In the embodiment (1)-(b) of the optical waveguide modulator equipped with an output light monitor of the present invention, preferably, the portion of the radiation mode light reflected on the reflecting surface portion of the cylindrical reinforcing capillary is outputted, as monitoring light, through the periphery of the cylindrical reinforcing capillary, and converged by the lens effect of the periphery of the cylindrical reinforcing capillary, and the converged monitoring light is received by the monitoring light-receiving means.

In the embodiment (1)-(b) of the optical waveguide modulator equipped with an output light monitor of the present invention, preferably, a light-reflective membrane is formed on the terminal light-reflecting surface portion of the reinforcing capillary.

In the embodiment (1)-(b) of the optical waveguide modulator equipped with an output light monitor of the present invention, preferably, a portion of the terminal surface of the reinforcing capillary is formed into a curved surface projecting outward, to thereby enable the monitoring light transmitted through the reinforcing capillary to be reflected on the curved surface portion of the terminal surface and converged, and to be received by the monitoring light-receiving means.

In the embodiment (1)-(b) of the optical waveguide modulator equipped with an output light monitor of the present invention, preferably, in the terminal surface of the reinforcing capillary, a boundary line between the light-reflecting surface portion and the non-monitoring surface portion is located between a transmitting path of a portion of the radiation mode light which reaches the light-reflecting surface portion and another transmitting path of another portion of the radiation mode light which reaches the non-monitoring surface portion; and the boundary line is positioned between a center line of the terminal surface of the reinforcing capillary intersecting the longitudinal axis of the hole and extending in the same direction as that of the boundary line, and a tangential line extending in parallel to the center line and coming into contact with a portion of a periphery line of the hole of the reinforcing capillary from which portion of the periphery line, the light-reflecting surface portion is formed.

In the embodiment (1)-(b) of the optical waveguide modulator equipped with an output light monitor of the present invention, preferably, the non-monitoring surface portion of the terminal surface of the reinforcing capillary is one formed in a manner such that a portion of the reinforcing capillary is cut off inward from the terminal surface of the capillary, while another portion of the reinforcing capillary having the light-reflecting surface portion of the terminal surface thereof is not cut off.

In the embodiment (1)-(b) of the optical waveguide modulator equipped with an output light monitor of the present invention, preferably, the non-monitoring surface portion of the terminal surface of the reinforcing capillary is a non-light reflecting surface not capable of reflecting the radiation mode light.

In the embodiment (1)-(b) of the optical waveguide modulator equipped with an output light monitor of the present invention, and preferably with respect to the non-monitoring surface portion of the terminal surface of the reinforcing capillary, a means for intercepting the radiation mode light reflected on the non-monitoring surface portion is arranged between the non-monitoring surface portion and the monitoring light-receiving means.

In the embodiment (1)-(b) of the optical waveguide modulator equipped with an output light monitor of the present invention, preferably with respect to the non-monitoring surface portion of the terminal surface of the reinforcing capillary, a means for intercepting the radiation mode light is provided in the reinforcing capillary and upstream of the non-monitoring surface portion.

In an embodiment (2) of the optical waveguide modulator equipped with an output light monitor of the present invention, preferably, the optical waveguide of the optical waveguide element has a monitoring light-outputting optical waveguide portion connected to the waveguide-connecting portion, in addition to the output light-outputting optical waveguide portion, to thereby output the monitoring light through the output end of the monitoring light-outputting optical waveguide portion.

In the embodiment (2) of the optical waveguide modulator equipped with an output light monitor of the present invention, preferably an end face of an optical fiber piece for outputting the monitoring light is connected to the outputting end of the monitoring light-outputting waveguide portion;

the optical fiber piece for outputting the monitoring light is held in a groove for the monitoring light, which groove is formed in the reinforcing capillary and is longer than the optical fiber piece for outputting the monitoring light; an end face of the groove for the monitoring light, facing the output end face of the optical fiber piece for outputting the monitoring light constitutes a reflecting surface for the monitoring light, whereby the monitoring light outputted through the output end of optical fiber piece for outputting the monitoring light is reflected on the above-mentioned reflecting surface, and the reflected monitoring light is received, as an outputted monitoring light, by the monitoring light-receiving means.

In the embodiment (2) of the optical waveguide modulator equipped with an output light monitor of the present invention, preferably, the reflecting end face of the groove for the monitoring light is constituted by a light-reflecting membrane.

In the embodiment (2) of the optical waveguide modulator equipped with an output light monitor of the present invention, preferably, the optical fiber piece for the output monitoring light is formed from a multi-mode optical fiber.

In the embodiment (2) of the optical waveguide modulator equipped with an output light monitor of the present invention, preferably, an X-coupler or a directional coupler is arranged in the waveguide-connecting portion of the optical waveguide element, and the output light-outputting optical waveguide portion and the monitoring light-outputting optical waveguide portion are connected to the X-coupler or the directional coupler.

In the embodiment (2) of the optical waveguide modulator equipped with an output light monitor of the present invention, preferably, the output light-outputting optical waveguide portion of the optical waveguide element is connected to the waveguide-connecting portion, and the monitoring light-outputting optical waveguide portion is connected to the output light-outputting optical waveguide portion through the directional coupler.

In the embodiment (2) of the optical waveguide modulator equipped with an output light monitor of the present invention, preferably, an end face of the monitoring light-outputting optical fiber piece is connected to an output end of the monitoring light-outputting optical waveguide portion;

the monitoring light-outputting optical fiber piece is held in a hole or groove formed in the reinforcing capillary and is not longer than the monitoring light-outputting optical fiber;

the hole or groove for the monitoring light formed in the reinforcing capillary inclines in a manner such that the farther the hole or groove for the monitoring light from the connection surface between the reinforcing capillary and the optical waveguide element, the farther the hole or groove for the monitoring light from the hole or groove for the output light; and the output end face of the monitoring light-outputting optical fiber piece is directed to the monitoring light-receiving means, whereby the monitoring light outputted from the output end face of the monitoring light-outputting optical fiber piece is received by the monitoring light-receiving means.

In the embodiment (2) of the optical waveguide modulator equipped with an output light monitor of the present invention, preferably the monitoring light-outputting optical fiber piece is formed from a multi-mode optical fiber.

In the embodiment (2) of the optical waveguide modulator equipped with an output light monitor of the present invention, preferably an X-coupler or a directional coupler is arranged in the waveguide-connecting portion of the optical waveguide element, and the output light-outputting optical waveguide portion and the monitoring light-outputting optical waveguide portion are connected to the X-coupler or the directional coupler.

In the embodiment (2) of the optical waveguide modulator equipped with an output light monitor of the present invention, preferably the output light-outputting optical waveguide portion of the optical waveguide element is connected to the waveguide-connecting portion, and the monitoring light-outputting optical waveguide portion is connected to the output light-outputting optical waveguide portion through the directional coupler.

In the embodiment (2) of the optical waveguide modulator equipped with an output light monitor of the present invention, preferably the monitoring light-outputting optical waveguide portion of the optical waveguide element is connected, together with the output light-outputting optical waveguide portion, to the waveguide-connection portion connected to the plurality of surface waveguide portions, through a directional coupler, a cross-coupler structure or a TAP coupler structure;

the output end of the output light-outputting optical waveguide portion is connected to an input end of an optical fiber inserted into the hole or groove of the reinforcing capillary;

the reinforcing capillary is formed from a light-intermitting material, to thereby enable the monitoring light outputted from the output end of the monitoring light outputting waveguide portion to pass and permeate through the reinforcing capillary, to be reflected on the light-reflecting surface portion provided in the reinforcing capillary, and to be received by the monitoring light-receiving means; and the output end of the output light-outputting optical waveguide portion and the output end of the monitoring light-outputting optical waveguide portion are spaced from each other through a distance, the spacing distance being sufficiently large not to cause the monitoring light outputted from the monitoring light-outputting optical waveguide portion and intermitting through the reinforcing capillary to be affected by the output light outputted from the output end of the output light-outputting optical waveguide portion.

In the embodiment (2) of the optical waveguide modulator equipped with an output light monitor of the present invention, preferably, the terminal surface of the reinforcing capillary is provided with a light-reflecting surface portion which intersects an optical axis of the monitoring light-outputting optical waveguide portion at an oblique angle, to thereby enable the monitoring light outputted from the output end of the monitoring light-outputting optical waveguide portion and transmitted through the reinforcing capillary to be reflected on the light-reflecting surface portion toward the monitoring light-receiving means.

In an embodiment (2) of the optical waveguide modulator equipped with an output light monitor of the present invention, preferably, the terminal surface of the reinforcing capillary is provided with a curved surface portion projecting outward, to thereby enable the monitoring light transmitted through the reinforcing capillary to be reflected and converged on the curved surface portion and to be received by the monitoring light-receiving means.

In an embodiment (2) of the optical waveguide modulator equipped with an output light monitor of the present invention, preferably, at least a region of the portion of the terminal surface of the reinforcing capillary, which portion does not contribute to transmitting and outputting the monitoring light directed to the monitoring light-receiving means, is cut off.

In an embodiment (2) of the optical waveguide modulator equipped with an output light monitor of the present invention, preferably, the light-reflecting surface portion of the terminal surface of the reinforcing capillary intersects the longitudinal axis of the hole for containing therein the output light-outputting optical fiber at an oblique angle, to thereby enable the radiation mode light reflected on the light reflecting surface portion is received, as monitoring light, by the monitoring light-receiving means.

In an embodiment (2) of the optical waveguide modulator equipped with an output light monitor of the present invention, preferably, the reinforcing capillary is in the form of a cylinder.

In an embodiment (2) of the optical wave guide modulator equipped with an output light monitor of the present invention, preferably, the light-reflecting surface of the cylindrical reinforcing capillary enables the radiation mode light reflected on the light-reflecting surface to pass through the cylindrical reinforcing capillary and to be outputted, as monitoring light, through the peripheral surface of the cylindrical reinforcing capillary, while the monitoring light is converged by the lens effect of the periphery of the cylindrical reinforcing capillary, and the converged monitoring light to be received by the monitoring light-receiving means.

In the embodiment (2) of the optical waveguide modulator equipped with an output light monitor of the present invention, preferably, in the terminal surface of the reinforcing capillary, a boundary line between the light-reflecting surface portion and the non-monitoring surface portion is located between a transmitting path of a portion of the radiation mode light forwarding to the light-reflecting surface portion and another transmitting path of another portion of the radiation mode light forwarding to the non-monitoring surface portion, and the boundary line is positioned between a center line of the terminal surface of the reinforcing capillary intersecting the longitudinal axis of the hole and extending in the same direction as that of the boundary line, and a tangential line extending in parallel to the center line and coming into contact with a portion of a periphery line of the hole of the reinforcing capillary from which portion of the periphery line, the light-reflecting surface portion is formed.

In the embodiment (2) of the optical waveguide modulator equipped with an output light monitor of the present invention, preferably, the non-monitoring surface portion of the terminal surface of the reinforcing capillary is one formed in a manner such that a portion of the reinforcing capillary is cut off inward from the terminal surface of the capillary, while another portion of the reinforcing capillary having the light-reflecting surface portion of the terminal surface thereof is not cut off.

In the embodiment (2) of the optical waveguide modulator equipped with an output light monitor of the present invention, preferably, the non-monitoring surface portion of the terminal surface of the reinforcing capillary is a non-light reflecting surface not capable of reflecting the radiation mode light.

In the embodiment (2) of the optical waveguide modulator equipped with an output light monitor of the present invention, preferably, with respect to the non-monitoring surface portion of the terminal surface of the reinforcing capillary, a means for intercepting the radiation mode light reflected on the non-monitoring surface portion is arranged between the non-monitoring surface portion and the monitoring light-receiving means.

In the optical waveguide modulator equipped with an output light monitor of the present invention, preferably, the optical waveguide element has a $SiO_2$ layer formed on a portion of the optical waveguide other than an input end portion of the surface optical waveguide portion and the output end portions of the output light-outputting optical waveguide portion and the monitoring light-outputting optical waveguide portion.

BRIEF DESCRIPTION OF THE DRAWINGS

FIG. 5 is an explanatory plan view showing a constitution of an embodiment of the optical waveguide modulator equipped with an output light monitor of the present invention.

FIG. 6 is an explanatory front view showing the constitution of the optical waveguide modulator equipped with an output light monitor shown in FIG. 5.

FIG. 17 is an explanatory cross-sectional view of the reinforcing capillary of the optical modulator of FIGS. 14 and 15.

BEST MODE OF CARRYING OUT THE INVENTION

Figure 1:
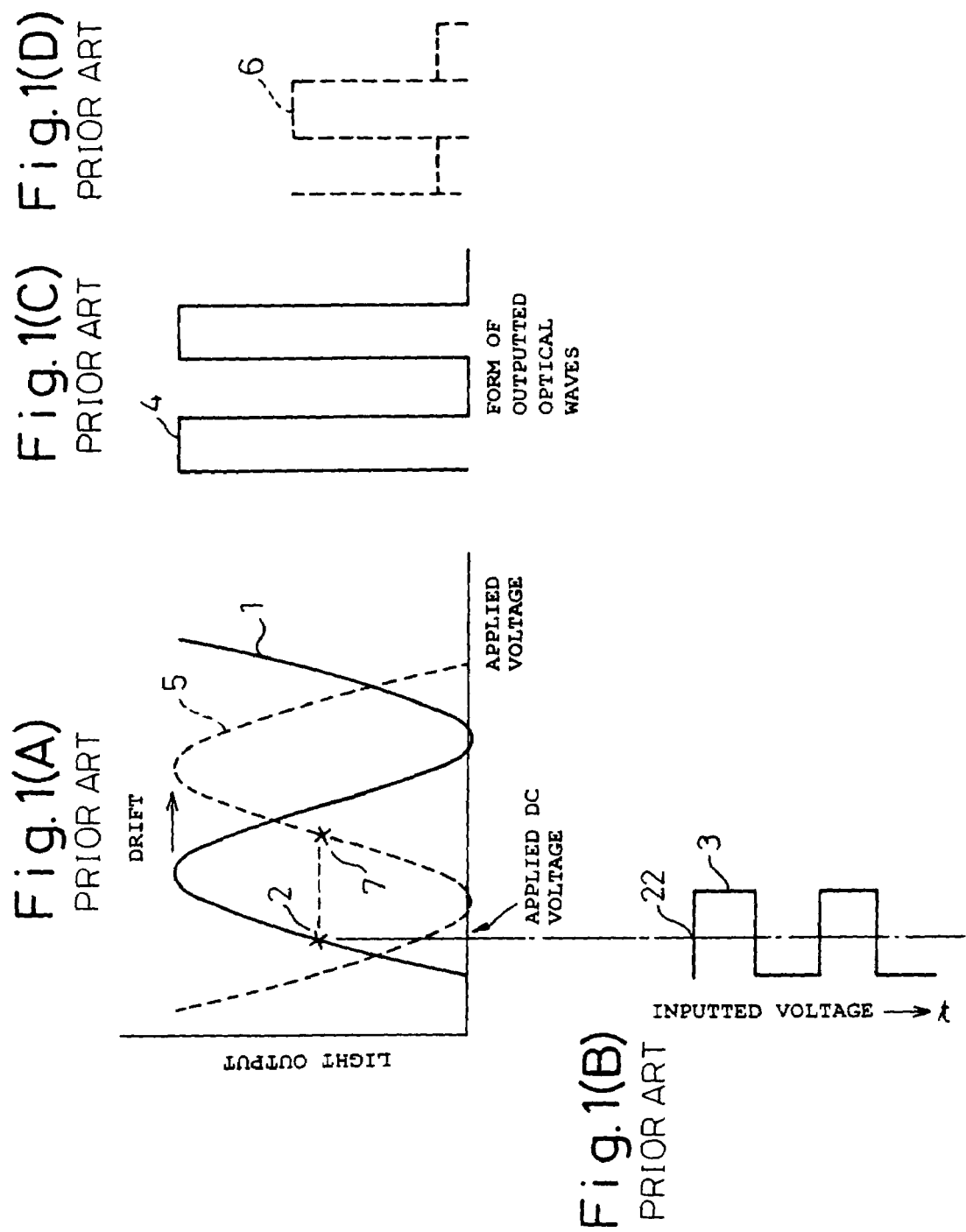
FIG. 1(A) is a graph showing an applied voltage-light output characteristic curve of a conventional modulator.
FIG. 1(B) shows a form of optical waves of an RF signal inputted into the modulator having the characteristic properties as shown in FIG. 1(A).
FIG. 1(C) shows a form of optical waves of an output signal outputted from the modulator having the characteristic properties as shown in FIG. 1(A).
FIG. 1(D) shows an irregular form of optical waves of a signal outputted from the above-mentioned modulator.

As mentioned above, in the optical waveguide modulator, usually a drift in working point voltage, which is referred to as a temperature drift and a DC drift, occurs and thus it is necessary that the working point voltage is controlled in response to the output of the modulator to retain the working point in the same one point on a particular characteristic curve even when the drift occurs. This necessity will be explained below in referring to FIGS. 1(A) to 1(D). In the form of waves 1 in the applied voltage-light output characteristic curve of a modulator, when a working point is located in a central point 2 of the wave form 1, and an RF signal 3 as shown in FIG. 1(B) is applied to the modulator through a light-inputting optical fiber 22, the resultant light output has a form of waves 4 of signal shown in FIG. 1(C) which form is analogous to that of the applied RF signal 3. In this case, when the form of waves of the characteristic curve is shifted to a form of waves 5 shown by dotted line in FIG. 1(A) due to a temperature drift and/or a DC drift, the resultant output waves take an irregular form 6 as shown in FIG. 1(D).

However, even when the characteristic curve takes the wave form 5, the output wave form can be retained in the form of the wave 4 by controlling the applied DC voltage so that the working point is located in the central point 7 of the waves 5.

Figure 2:
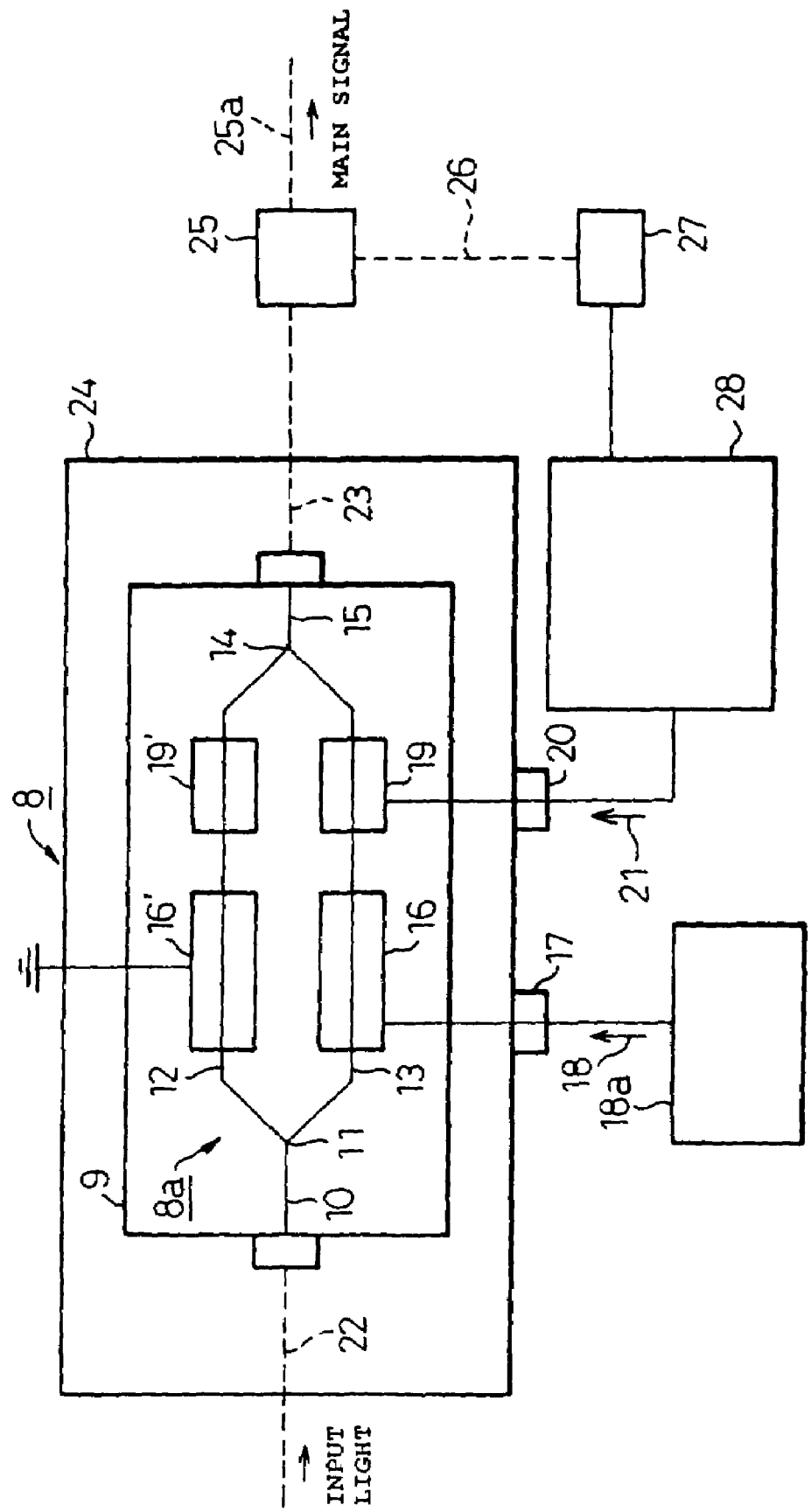
FIG. 2 is an explanatory plan view showing a constitution of an embodiment of the conventional optical waveguide modulator equipped with an output light monitor.

FIG. 2 shows a constitution of an embodiment of the conventional optical waveguide modulator equipped with an output light-feeding back controlling system. In FIG. 2, a modulator chip 9 of an optical waveguide modulator 8 is a substrate plate consisting of a LN or GaAs crystal, and on a surface portion of the substrate plate 9, a Mach-Zehnder type (MZ type) waveguide 8a comprising an input waveguide portion 10, an Y-shaped separation portion 11. MZ arm waveguide portions 12, 13, a wave-combining device 14 and output waveguide portion 15, is formed. Control electrodes 16, 16' are arranged close to the arm waveguide portions 12, 13. Between the electrodes 16 and 16', a RF signal voltage 18 is applied from a RF signal-oscillator (electrode-control circuit 18a) through a connector 17, and in response to the applied RF signal 18, the light transmitting through the waveguide 8a is phase-modulated and wave-combined in the wave-combining device 14. The output light changed in intensity as mentioned above is outputted from the output waveguide portion 15 through an optical fiber 23 for output light.

Separately, a DC voltage 21 is applied between the electrodes 19 and 19' arranged respectively in series to the RF electrodes 16 and 16' through a DC terminal 20, to establish the working point of the modulation curve in a center point 2 of the RF signal 18. The input and output waveguide portions 10 and 15 are respectively connected to the input and output optical fibers 22 and 23. The output optical fiber 23 is connected to an optical coupler 25 located outside of the modulator modul 24. In the optical coupler 25, the output light is divided into a main signal light 25a and a branch light 26. The main signal light 25a is outputted from the optical coupler 25, and the branch light 26 is inputted to a photoelectric conversion element 27 and converted to electric signal. The electric signal is inputted to a bias control circuit 28 and controls the DC voltage 21 in the circuit. By controlling the DC voltage 21 as mentioned above, even which a DC drift occurs, it becomes possible to identify the working point on the modulation curve and to prevent straining of the modulation curve.

However, in the conventional modulator as shown in FIG. 2, the optical coupler 25 and the photoelectric conversion element 27 are necessarily arranged, and this necessity causes the cost of the modulator system to increase, the limitation on the dimensions and form of the system to be severe and the reliability of the system to decrease.

Figure 3:
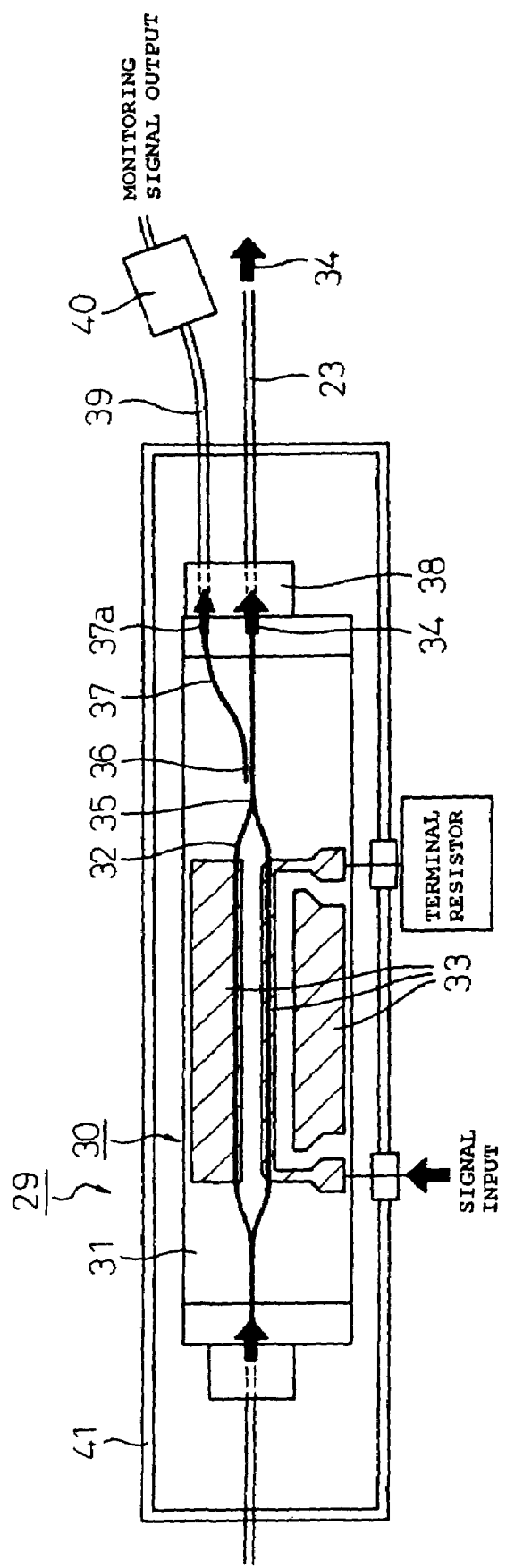
FIG. 3 is an explanatory plan view showing a constitution of another embodiment of the conventional optical waveguide modulator equipped with an output light monitor.

FIG. 3 shows an explanatory plan view of another embodiment of the conventional optical waveguide modulator equipped with an output light monitor. Referring to FIG. 3, in an optical waveguide element 30 of a modulator 29, a Mach-Zehnder (MZ) type optical waveguide 32 and electrodes 33 for controlling the optical waveguide 32 are arranged on a dielectric substrate plate 31, and an output signal light 34 is outputted from an output end of the optical waveguide 32 through an optical fiber 23. In the element 30, an optical waveguide portion 37 for monitoring light is connected to a portion of the waveguide 32 located downstream from a connection portion 35 through a directional connector 36, and a portion of the light outputted through the connection portion 35 is separated from the outputted light and utilized as monitoring light. The optical waveguide portion 37 for the monitoring light is connected at an output end thereof to an optical fiber 39 for the monitoring light held by a reinforcing member 38, and the monitoring light 37*a* outputted through the optical fiber 39 for the monitoring light is received by a light-receiving element 40. From this light-receiving element 40, a monitoring signal is outputted.

Even in the modulator shown in FIG. 3, as the light-receiving element is arranged outside of the container case 41 in which the optical waveguide element is contained, and connected to the optical fiber for the monitoring light, the modulator is disadvantageous in that the cost of the modulator system is high, the limitation on the dimensions and form of the modulator is severe, and the reliability is insufficient.

The optical waveguide modulator equipped with an output light monitor of the present invention comprises:

an optical waveguide element comprising a dielectric substrate and an optical waveguide formed on a front surface of the dielectric substrate, the optical waveguide comprising a plurality of surface optical waveguide portions, an optical waveguide connecting portion on which the surface optical waveguide portions are converged and connected to each other and an output light-outputting optical waveguide portion connected to the optical waveguide-connecting portion;

an optical fiber for output light, connected to an output end of the output light-outputting optical waveguide portion of the optical waveguide element;

a reinforcing capillary for reinforcing a connection between the optical waveguide element and the output light-outputting optical fiber; and a means for receiving monitoring light, wherein the reinforcing capillary is provided with a hole or groove formed therein for containing and holding the optical fiber for output light, a connection surface thereof connected to an output end side surface of the substrate of the optical waveguide element, and a terminal surface thereof opposite to the connection surface, to thereby enable the reinforcing capillary to receive the monitoring light outputted from the optical waveguide element through at least one member selected from the capillary itself and the optical fiber for the monitoring light located in the capillary, to transmit the monitoring light therethrough and to output the monitoring light to the outside of the capillary; and the monitoring light-receiving means is located in a position in which the monitoring light outputted from the reinforcing capillary to the outside of the capillary can be received, and is provided with a photoelectric conversion element.

In an embodiment (1) of the optical waveguide modulator equipped with an output light monitor of the present invention, the reinforcing capillary is formed from a light-transmitting material, for example, a transparent glass, to thereby enable radiation mode light generated in the optical waveguide connecting portion of the optical waveguide element to pass through the dielectric substrate and to be received by the light-transmittable reinforcing capillary, and the radiation mode light outputted from the reinforcing capillary to be received, as monitoring light by the monitoring light-receiving means.

In an optical modulator, containing a Mach Zehnder type waveguide and being capable of outputting ON/OFF signal, radiation mode light generated in an OFF mode condition, namely, a condition in which no light signal is outputted, is radiated in the substrate plate in an outwardly oblique direction with respect to the output light waveguide through which the optical signal output is guided. Usually, the radiation mode/light passes through the substrate plate at a radiation angle of about 0.7 degree while receding from the output waveguide portion, and finally is radiated from an end face of the substrate plate to the outside thereof. The quantity of the radiation mode light is in a complementary relationship with a quantity of the output signal light transmitting through the output light-outputting waveguide portion, and thus the light signal output can be monitored by detecting the radiation mode light.

In the optical modulator, an optical fiber is connected to an end face of the substrate plate to receive an optical signal output from the optical waveguide and to introduce the optical signal output to the outside of the modulator. Since the optical fiber has a very small outer diameter of 125 µm, when the fiber is simply adhered to the substrate plate end face, the resultant bonding strength between the fiber and the end face is insufficient. Therefore, a reinforcing capillary is used as an optical fiber-reinforcing material to cover the optical fiber. Namely, by bonding an end surface of the reinforcing capillary to the end face of the substrate plate, the connection between the optical fiber and the optical waveguide can be reinforced and protected and the bonding strength between the optical fiber and the optical waveguide can be increased. Usually, the reinforcing capillary is made from a silicon material or a ceramic material. When the reinforcing capillary is produced from a material capable of transmitting the signal light and the radiation mode light therethrough, and has a size sufficiently large to receiving the radiation mode light radiated from the end face of the substrate plate, the radiation mode light can be introduced into the reinforcing capillary.

Figure 4A:
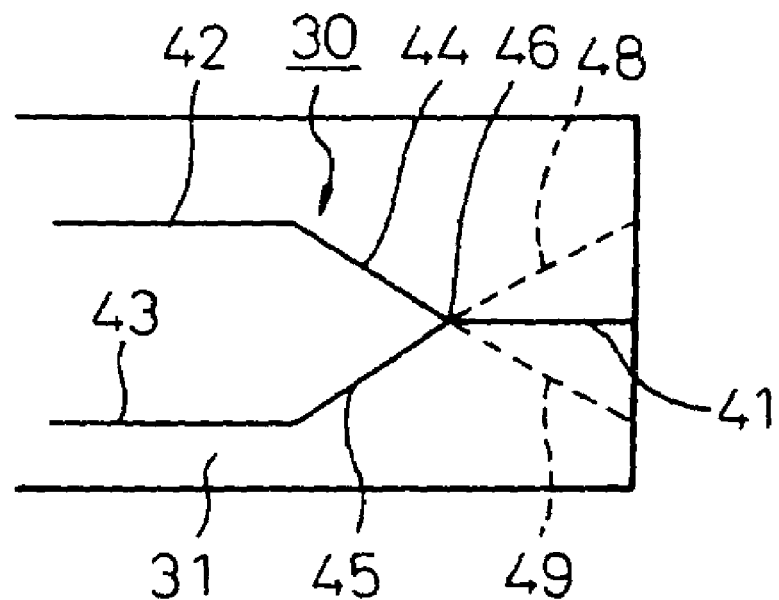
FIG. 4(A) is an explanatory plan view showing a generation of radiation mode light in an optical waveguide element having a plurality of surface waveguide portions and a waveguide-connection portion at which the surface waveguide portions are converged and connected to each other.
Figure 4B:
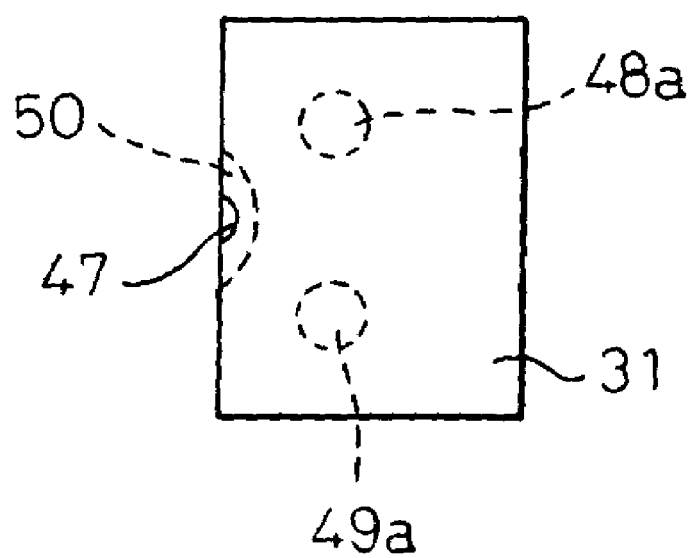
FIG. 4(B) is an explanatory side view showing a generation of the radiation mode light in the optical waveguide element shown in FIG. 4(A).

Referring to FIGS. 4(A) and 4(B), the radiation mode light will be explained below. In FIG. 4(A), an optical waveguide 30 is formed on a dielectric substrate plate 31. The optical waveguide 30 comprises an input portion (not shown) connected to a light input source (not shown), branched surface waveguide portions 42, 43 branched from the input portion, output portions 44 and 45 of the branched surface waveguide portions 42, 43, a connection point 46 to which the output portions 44, 45 are converged so that the light transmitted through the branched portions 42 and 44 and 43 and 45 are combined with each other, while the light interferes, and an output portion 47 extending from the connection part 46. When an RF signal is applied to electrodes (not shown) arranged close to the branched portions 42 and 43, the optical phases of the light waves transmitting through the branched portions 42 and 43 differently change from each other, and thus when the light waves are combined with each other in the connection portion 46, the combined light waves interfere with each other and the intensity of light changes in response to the RF signal, and resultant optical signal is outputted through the waveguide output portion 47. In this case, light which is in a complementary relationship to the optical signal is radiated, as radiation mode lights 48 and 49 from the connection portion 46 into the substrate plate 31 and is transmitted through transmission paths 48 and 49 extending in both sides of the output portion 47 in an oblique outward directions.

The radiation mode lights 48 and 49 are higher mode lights than single mode light outputted from the output portion 47 of the optical waveguide 30. The radiation mode lights 48 and 49 are different in phase angle of 180 degrees from each other.

In FIG. 4(B), an explanatory view of a right side end face, of the optical waveguide element shown in FIG. 4(A), is shown. In FIG. 4(B), a signal light 50 passing through the output portion 47 of the optical waveguide and each of the radiation mode lights 48 and 49 transmitting through the radiation mode light-transmission pathes 48a and 49a make an angle of about 0.7 degree to each other.

In an example of the embodiment (1) of the optical waveguide modulator equipped with an output light monitor of the present invention, the terminal surface of the reinforcing capillary formed from the light-transmittable material is a light-reflective surface, to thereby enable the radiation mode light radiated from the optical waveguide connecting portion of the optical waveguide element to pass through the dielectric substrate of the optical waveguide element and the reinforcing capillary connected to the output end surface of the dielectric substrate, and to be reflected on the terminal light-reflective surface, and the reflected radiation mode light to be received, as a monitoring light by the monitoring light-receiving means.

Also, the reinforcing capillary is preferably in the form of a cylinder made of a transparent glass. In the cylindrical transparent glass reinforcing capillary, preferably, the hole or groove for holding the optical fiber for the output light is formed along the longitudinal axis of the transparent glass cylindrical capillary, and the longitudinal axis of the hole or groove intersects the light-reflective terminal surface at an oblique angle.

Generally, a longitudinal axis of the hole or groove for holding therein an optical fiber for the output light preferably extends in a direction at a right angle to the connection end surface of the reinforcing capillary. In the case where the terminal surface of the reinforcing capillary (a surface of the reinforcing capillary opposite to the connection end surface on which the reinforcing capillary is connected to an output end surface of the optical waveguide element) is formed at an oblique angle to the longitudinal direction of the hole or groove for holding therein the optical fiber for the output light, the radiation mode light transmitted through the reinforcing capillary is reflected on the oblique terminal surface of the capillary, and is radiated to the outside of the reinforcing capillary (in any of upward, downward, rightward and leftward directions different from the outputting direction of the output light. The radiated light can be detected by a monitoring light-receiving means, for example, a photodiode (PD) arranged in the optical waveguide element-containing case, separate from the optical waveguide element, the quantity of the radiation mode light can be determined and, thus, in response to the detected quantity of the radiation mode light, the quantity of the outlet light outputted from the optical waveguide can be monitored.

By establishing the oblique angle and the oblique direction of the oblique terminal surface of the reinforcing capillary, the reflection radiation direction of the radiation mode light can be established, and the light-receiving means can be located, fixed and connected at a position capable of receiving the radiated light. Thus, by establishing the oblique terminal surface of the reinforcing capillary, the position of the light-receiving means can be selected so that the function of the optical waveguide element and the arrangement of each part member are not affected by the light-receiving means. The oblique terminal surface of the reinforcing capillary is optionally covered by a light-reflective membrane formed from a metallic material or a dielectric material, to thereby enable the reflection efficiency of the radiation mode light to be enhanced. The light-reflective membrane can be formed by sputtering metallic aluminum.

The optical waveguide of the optical waveguide element for the present invention is provided with a plurality of surface waveguide portions, a waveguide-connecting portion in which the surface waveguide portions are connected to each other, and an output waveguide portion connected to the waveguide-connecting portion, and they are formed in the surface portion of the dielectric substrate. The plurality of surface waveguide portions may be branched from a light input waveguide portion, or may be those capable of receiving light at the end faces thereof opposite to the waveguide connection portion.

The output end of the optical waveguide is connected to an end face of an output light-outputting optical fiber. The connecting end portion of the optical fiber is reinforced by a reinforcing capillary. The reinforcing capillary has a size sufficient to receive the radiation mode light radiated from the optical waveguide and pass the radiation mode light therethrough. The reinforcing capillary has an end face thereof bonded to an output end face of the optical waveguide element to provide a connection end face, and an opposite terminal surface inclined with respect to the connecting end face to provide an inclined terminal surface. As mentioned above, the reinforcing member has a hole or groove through which the connection end face and the inclined terminal surface are connected to each other and in which the output light-outputting optical fiber is held. The hole or groove is formed along the longitudinal axis of the reinforcing capillary and the longitudinal axis and the inclined terminal surface intersect each other at an oblique angle. The groove may be covered after the optical fiber is placed in the groove, or not covered. The end face of the optical fiber held in the hole or the groove of the reinforcing capillary is connected to the output end face of the optical waveguide, as mentioned above.

FIG. 5 is an explanatory plan view showing a constitution of an embodiment of the optical waveguide modulator equipped with an output light monitor of the present invention, in which no ceiling plate is shown. FIG. 6 is an explanatory front view of the modulator of FIG. 7, and FIG. 7 is an explanatory side view showing the constitution of the connection part of the end face of the optical waveguide element of the modulator of FIGS. 5 and 6 with the optical fiber and the reinforcing member.

Figure 7:
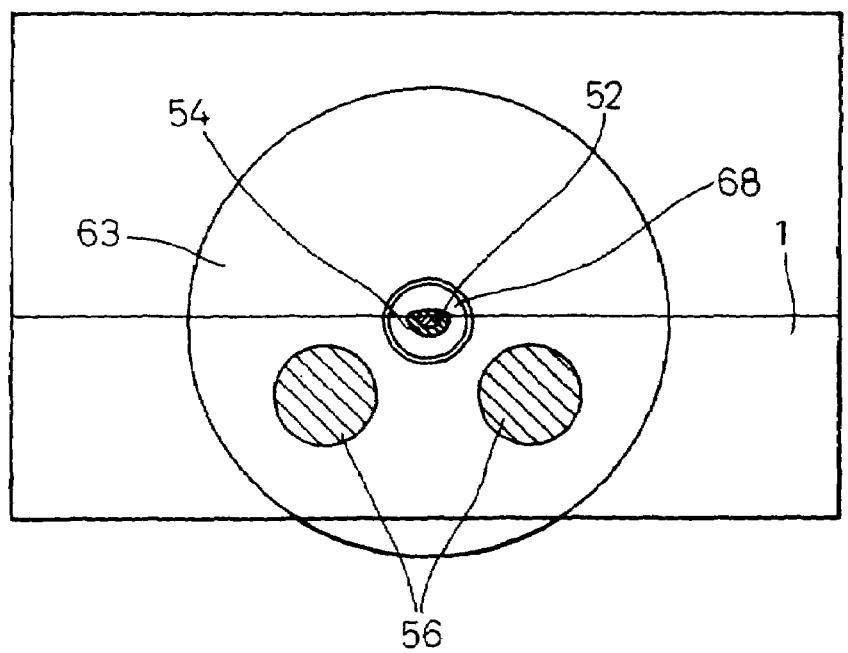
FIG. 7 is an explanatory side view showing arrangements of a reinforcing capillary and an optical fiber and conditions of output light and radiation mode light at an output end face of the optical waveguide element of the modulator shown in FIGS. 5 and 6.

In FIGS. 5, 6 and 7, on a substrate plate 51 of an optical waveguide element, a Mach-Zehnder type (MZ type) optical waveguide 52 and electrodes 53 for controlling the waveguide are arranged, and an output signal light 54 is outputted from the output end of the optical waveguide 52. Radiation mode light 56 is radiated from the connecting portion 55 of the optical waveguide 52, passes through the substrate plate 51 and is radiated toward the outside of the substrate plate 51.

The modulator is contained in a modulator box 57, input light 58 is inputted into the optical waveguide 52 through an input side optical fiber 59. The optical fiber 59 is supported and reinforced with an input side fiber-reinforcing member 60, and an end of the optical fiber 59 is connected to an input end of the optical waveguide 52. The control electrodes 53 are controlled by control signal which is inputted into the electrodes through a connector 61 for inputting the control signal and outputted therefrom through a connector 62 for outputting the signal.

The output end face of the optical waveguide element is connected to a connecting end face of the reinforcing capillary 63, to enable the radiation mode light 56 transmitted through the substrate plate 51 to be introduced into the inside of the reinforcing capillary 63. The radiation mode light 56 is reflected on an inclined terminal surface 64 of the reinforcing capillary 63 and is radiated toward the outside of the reinforcing capillary. The radiated radiation mode light is received by a light-receiving means 66 and is monitored. The monitor signal output from the light-receiving means 66 is outputted through a connector 67 located on the box 57. A light-outputting optical fiber 68 is supported in a hole formed in the reinforcing capillary 63, and an end face of the optical fiber 68 is connected to an output end face of the optical waveguide 52.

In the input end portion of the optical waveguide element shown in FIGS. 5, 6 and 7, an end face of the input side optical fiber 59 is connected to an input end face of the optical waveguide 52, and these connecting portions are reinforced by an input side reinforcing member 60. Input light 58 is inputted into the optical waveguide 52 through the optical fiber 59.

The above-mentioned members connected with each other are contained in the box 57, and an upper opening of the box is closed and sealed with a ceiling plate (not shown in FIGS. 5 to 7).

The other ends of the input side and output side optical fibers are extended to the outside of the box through fiber guide holes formed in the box. The fiber guide holes may be sealed, or the above-mentioned members placed in the box may be fixed to the box and the ceiling plate and holes formed in the box may not be sealed.

In the modulator of the present invention, where the radiation mode light is utilized as a monitoring light, the reinforcing capillary is formed from a radiation mode light-transmitting material. The reinforcing capillary used for this case is formed from transparent silicon materials (silicon single crystal), glass materials (for example, guartz glass or boro-silicate glass), or ceramic materials. There is no specific limitation to the form and the dimensions of the reinforcing capillary, as long as the resultant reinforcing capillary is usable for monitoring the radiation mode light. Preferably, the reinforcing capillary is in the form of a cylinder having a hole. The hole or groove of the reinforcing capillary for supporting the optical fiber is preferably formed along the longitudinal axis of the cylindrical reinforcing capillary, and the longitudinal axis intersects the inclined end face of the cylindrical reinforcing capillary at an oblique angle.

The radiation mode light reflected on the light reflective terminal surface of the cylindrical reinforcing capillary having the hole is transmitted toward a periphery of the capillary and then is outputted as a monitoring light through the periphery of the cylindrical reinforcing capillary; the outputted monitoring light is converged by a lens effect of the periphery of the cylindrical reinforcing capillary; and the converged monitoring light is received by the monitoring light-receiving means.

As shown in FIG. 6, a first strain-preventing groove 69 is formed on a portion of the bottom surface of the reinforcing capillary 63 and close to the connection surface of the reinforcing capillary, and a second stain-preventing groove 70 is formed on a portion of the bottom surface of the reinforcing capillary and close to the inclined terminal surface of the reinforcing capillary. The first stain-preventing groove 69 can receive therein an excessive amount of an adhesive agent applied between the connection surfaces of the reinforcing capillary and the optical waveguide element to prevent staining of the periphery of the reinforcing capillary through which the radiation mode light is outputted. Also, the second stain-preventing groove 70 can receive therein an excessive portion of an adhesive agent applied between the optical fiber for the output light and the hole or groove of the reinforcing capillary to prevent staining of the periphery of the reinforcing capillary through which the radiation mode light is outputted.

Also, in an embodiment of the modulator of the present invention, the terminal surface of the reinforcing capillary may be formed into a curved surface projecting outward to thereby enable the monitoring light transmitted through the reinforcing capillary to be reflected and converged on the curved terminal surface, and then to be received by the monitoring light-receiving means.

The above-mentioned optical waveguide modulator equipped with an output light monitor of the present invention exhibits the following advantages.

(1) The structure is simple.
   Namely, in the modulator equipped with the output light monitor of the present invention, the form and constitution of the light intensity modulator and the assembling method and technique for the optical elements are the same as those having no output light-monitor and thus no new technology is necessary.

(2) The monitoring output light is transmissible through space and thus no optical fiber for transmitting the monitoring light is necessary.
   Thus when the optical waveguide element is placed in and fixed to the box, specific procedures for connecting an optical fiber to a waveguide for outputting the monitoring light, for fixing the light-receiving means to the optical waveguide element and for distributing electric circuits for the light-receiving means, are unnecessary. Also, the light-receiving means and electric circuits thereof can be preliminarily arranged in the box. Further, no specific design for carrying out the above-mentioned procedures is necessary for the box.

(3) The monitoring light can be radiated in any direction.
   Thus, the location of the light-receiving means can be freely established and, thus, as the light-receiving means can be arranged in open space in the box, no specific design for arranging the light-receiving means in the box is necessary.

(4) The radiation mode light is utilized.

The radiation mode light which is usually not utilized for non-light intensity modulator is utilized as monitoring light, and thus not only no specifically designed portion of the optical waveguide element, for example, a branched portion of the optical waveguide for outputting the monitoring light, is necessary, but also no increase in light transmission loss which is a possible problem of the modulator does not occur.

Accordingly, the conventional type of light intensity modulator can be used for the modulator equipped with the output light monitor without arranging the branched portion of the optical waveguide element for the monitoring light and the lens for picking up the monitoring light.

In another example of the embodiment (1) of the optical waveguide modulator equipped with an output light monitor of the present invention, the terminal surface of the reinforcing capillary formed from the light-transmittable material is provided with a surface portion in which the monitoring light is reflected and a non-monitoring surface portion, whereby when the radiation mode light radiated from the optical waveguide connection portion of the optical waveguide element through both side portions of the output light-outputting optical waveguide portion transmit through the dielectric substrate of the optical waveguide element and the reinforcing capillary connected to the output end surface of the dielectric substrate, only a portion of the radiation mode light radiated to one side portion of the output light-outputting optical waveguide portion is reflected on the monitoring light-reflecting surface portion of the reinforcing capillary toward the monitoring light-receiving means, received as a monitoring output light by the monitoring light-receiving means, and another portion of the radiation mode light which reaches the non-monitoring surface portion is not received as a monitoring light by the monitoring light-receiving means.

In this case, preferably, the terminal reflecting surface portion of the reinforcing capillary intersects the direction of the longitudinal axis of the hole or groove in which the output light-outputting optical fiber is received, at an oblique angle, to thereby enable the radiation mode light reflected on the terminal reflecting surface portion to be received, as monitoring light, by the monitoring light-receiving means.

Also, the reinforcing capillary is preferably in the form of a cylinder having a hollow as a hole as mentioned above. In this case, the portion of the radiation mode light reflected on the reflecting surface portion of the cylindrical reinforcing capillary is outputted, as monitoring light, through the periphery of the cylindrical reinforcing capillary, and the converged by the lens effect of the periphery of the cylindrical reinforcing capillary, and the converged monitoring light is received by the monitoring light-receiving means.

Figure 8:
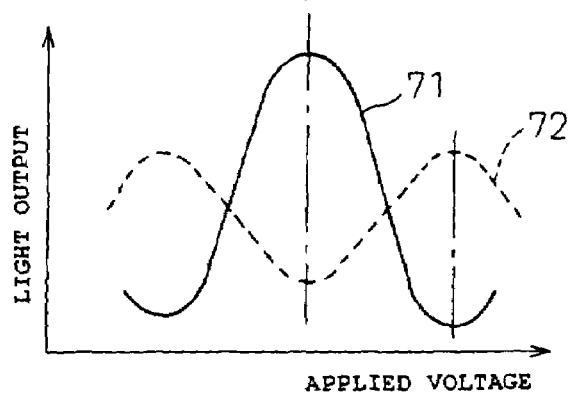
FIG. 8 is a graph showing embodiments of wave forms of the signal light and the monitoring light outputted from the modulator shown in FIGS. 5 and 6.

FIG. 8 shows an example of waveforms of light reflected on the reflecting terminal surface, and monitored by and outputted from the light-receiving means in the modulator as shown in FIGS. 5 and 7. In FIG. 8, a curve 71 shows a waveform of the light signal 54 outputted through the output optical fiber 68, and a curve 72 shows a waveform of the light when the reflected radiation mode light 65 is monitored by a photoelectric conversion element of the light receiving means 66. The optical waves 71 and 72 different from each other are in a supplementary relation to each other.

Figure 9:
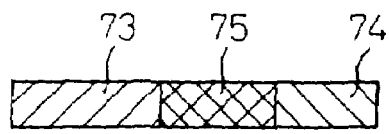
FIG. 9 is an explanatory view showing a light-incident surface region of a photoelectric conversion element of the monitoring light-receiving means, to which region, the radiation mode light (monitoring light) reflected in the modulator shown in FIGS. 5 and 6 is inputted.

In the modulator shown in FIGS. 5 to 7, a portion of the radiation mode light reflected on a lower half portion of the reflecting terminal surface of the reinforcing capillary 63 and close to the light receiving means 66 and another portion of the radiation model light reflected on an upper half portion of the reflecting terminal surface of the capillary 63 and far from the light receiving means 66 are respectively introduced into incidence rectangular areas 73 and 74, as shown in FIG. 9, of the light receiving surface of the light receiving means 66. When portions of the rectangular area 73 and 74 are overlapped on each other, portions of the radiation mode light introduced into an overlapped area 75 interfere with each other, and thus a problem such that the monitoring light output of the photoelectric conversion element in the light receiving means varies due to disturbances, such as environmental temperature and others, may occur.

This problem can be resolved by the following manner.

Figure 10:
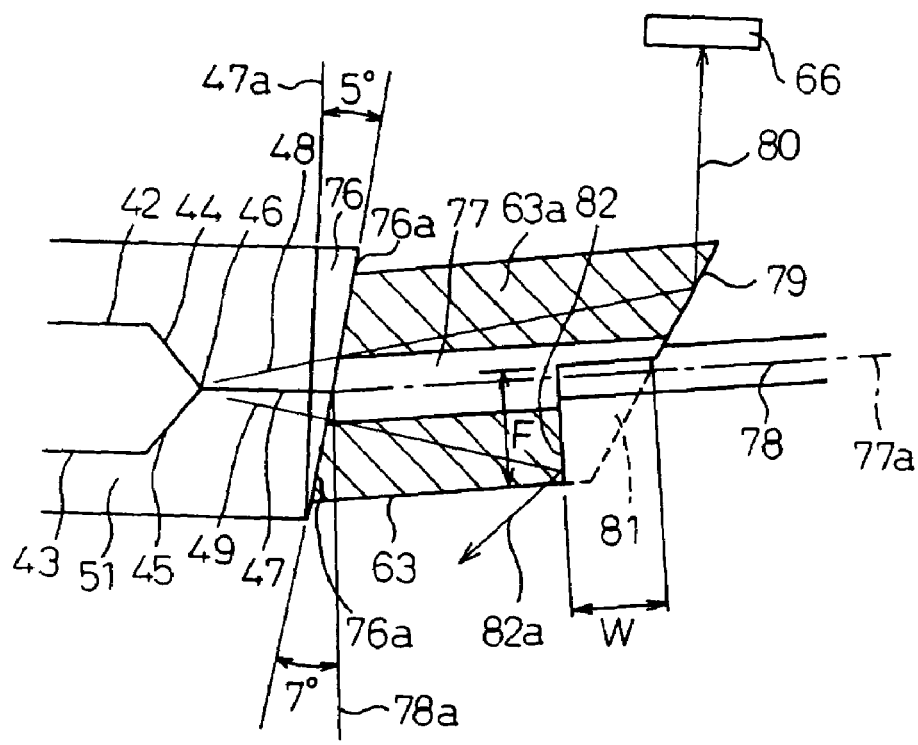
FIG. 10 is an explanatory plan view showing a constitution of an important portion of the optical waveguide modulator equipped with an output light monitor of the present invention.

In an optical waveguide modulator equipped with an output light monitor of the present invention as shown in FIG. 10, a monitoring light-reflecting surface is formed in a half portion of the terminal surface of a reinforcing capillary and a non-monitoring surface for not allowing the radiation mode light to be received by a light receiving means is formed in another half portion of the terminal surface, to thereby enable a portion of the radiation mode light transmitting through the inside portion 63a of the capillary 63 to be reflected only on about half portion of the terminal surface of the reinforcing capillary 63 toward the light receiving means (photoelectric conversion element) and to be received by the light receiving means.

In FIG. 10, an end surface 76a of the output end portion of the substrate plate 51 and of the output end portion of a reinforcing member 76 adhered to the substrate plate 51 is formed at an oblique angle, for example, of 5 degrees, from a plane 47a at a right angle with respect to a longitudinal center axis of a optical waveguide output portion 47.

The capillary 63 has a longitudinal center axis extending at an oblique angle from the longitudinal direction of the optical waveguide output portion 47, and thus the output end of the optical waveguide output portion 47 and a connection end of an optical fiber (not shown in FIG. 10) are connected to each other at an oblique angle to each other. For example, an end face 76a of the reinforcing member 76 and a plane 78a formed at right angles with respect to the longitudinal center axis 78 of the hole 77 for the optical fiber of the reinforcing capillary 63 make an oblique angle of 7 degrees.

In FIG. 10, a reflecting surface is formed on an upper half portion 79 (namely an about half portion close to the light receiving means 66) of the terminal surface of the capillary 63 and only a portion of the radiation mode light 80 reflected on the upper half reflecting surface portion 79 is received by the light receiving means 66. A lower half portion of the terminal surface of the reinforcing capillary 63 is cut, as shown in FIG. 10, to a depth W from the terminal surface, and a terminal lower half portion 81 of the reinforcing capillary 63 is removed to a depth F from the periphery of the capillary 63. Due to the removal of the portion 81, on a terminal surface portion 82 formed in the lower portion of the reinforcing capillary 63, the radiation mode light is reflected in a direction shown by an arrow 82a, and thus the reflected radiation mode light is not received by the light receiving means 66. For this reasons, a portion of the radiation mode light reflected on the lower half portion of the terminal surface of the reinforcing capillary is not received by the light receiving means and thus no interfering surface area such as surface area 75 shown in FIG. 5 is formed. Therefore, the monitoring light outputted from the photoelectric conversion element of the light receiving means is stabilized.

As angle between the terminal reflecting surface 79 and the longitudinal center axis 77a of the hole 77 is established so that the reflected light can be received by the light receiving means 66, preferably in the range from 40 to 46 degrees. The length of the reinforcing capillary 63 is established so that the optical fiber can be steadily held in the capillary, preferably in the range from 2 to 4 mm, and the diameter of the reinforcing capillary 63 is established so that a reflecting terminal surface necessary to enable the light receiving means to receive a desired amount of the radiation mode light can be formed and, usually, the diameter of the reinforcing capillary 63 is preferably in the range of from 0.25 to 2.5 mm. The radiation mode light reflected on the reflecting surface 79 of the reinforcing capillary 63 preferably enters, as an incident light, into a light receiving surface of the photoelectric conversion element of the light receiving means at approximately a right angle to the light receiving surface.

The periphery of the reinforcing capillary is preferably in the form of a cylindrical periphery. In this case, the periphery surface of the capillary exhibits a lens effect of a circular cylinder periphery having a finite (limited) focal distance. Preferably, the light receiving surface of the photoelectric conversion element is arranged on or around the focus of the lens to thereby make the S/N better.

By the removal of the lower half portion 81 of the terminal surface portion of the reinforcing capillary 63, as shown in FIG. 10, the following advantages can be obtained.

(1) For the purpose of passing the optical fiber 76 through the hole 77 of the reinforcing capillary 63, the diameter of the hole 77 is preferably as large as possible. However, since the angle of radiation of the radiation mode light is about 0.7 degree which in small, for the purpose of causing the radiation mode light to transmit through the inside 63a of the capillary, the diameter of the hole is preferably as small as possible. Accordingly, the hole is formed at an inside diameter of 1 μm larger than the outside diameter of the optical fiber. In this case, when whole the terminal surface of the reinforcing capillary is in the form of an inclined surface, as shown in FIGS. 5 and 6, it is very difficult to introduce the optical fiber into the hole. Also, usually, to make easy the introduction of the optical fiber into the hole, usually a tapered portion is formed in the optical fiber introduction portion of the hole. However, the tapered optical fiber-introduction portion cannot be employed due to the same reasons as mentioned above. However, when the structure shown in FIG. 10 is used, a portion of the hole facing the removed portion 81 can work as a groove for introducing the optical fiber into the hole, and can guide the optical fiber and can cause the introduction of the optical fiber into the hole to be easy.

(2) Also, the optical fiber is adhered and fixed with an adhesive in the hole of the reinforcing capillary after alignment of the fiber to reinforce the fiber. In this case a problem such that the adhesive stains the reflecting terminal surface of the capillary, and the reflecting property of the terminal surface is varied, may occur. The vacant portion 81 serves as a trap for the adhesive to prevent the staining of the reflecting terminal surface 79.

Figure 11:
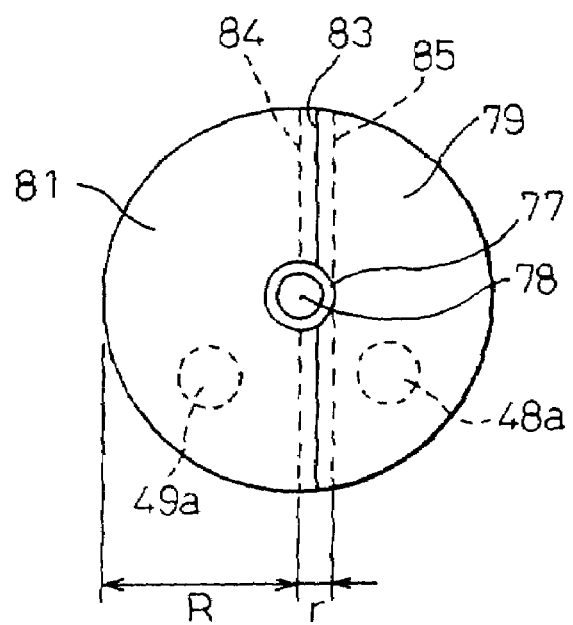
FIG. 11 is an explanatory side view showing an example of the form of a radiation mode light-reflection surface formed at a terminal of a reinforcing capillary of the optical modulator shown in FIG. 5.

In the terminal surface of the reinforcing capillary 63, to cause the vacant portion 81 of the reinforcing capillary 63 to exhibit the above-mentioned effects, preferably, a boundary line between approximately a half portion of the terminal surface of the reinforcing capillary which serves as a reflecting surface and another approximately half portion of the terminal surface is located between a transmitting path of a portion of the radiation mode light which transmits toward the light-reflecting terminal surface portion and another transmitting path of another portion of the radiation mode light which transmits toward the another portion of the terminal surface; and the boundary line is positioned between a center line of the terminal surface of the reinforcing capillary intersecting the longitudinal axis of the hole and extending in the same direction as that of the boundary line, and a tangential line extending in parallel to the center line and coming into contact with a portion of a periphery line of the hole of the reinforcing capillary from which portion of the periphery line, the light-reflecting surface portion is formed. Namely, in FIG. 10, in view of a cross-section at a right angle to the longitudinal center axis of the hole of the reinforcing capillary 63, as shown in FIG. 11, it is preferable that a boundary line 83 between the half portion forming the reflecting surface 79 and the vacant portion 81 be located between the transmitting paths 48a and 49a of the radiation mode light, and also between the center line 84 intersecting the center axis 77a of the hole 77 and the tangential line 85 coming into contact with the periphery line of the hole 77. In the other words, in FIG. 10, the cutting depth F of the vacant portion from the periphery of the reinforcing capillary, the radius R of the reinforcing capillary and the radius r of the hole preferably satisfy the following relationship.

$$R \leq F \leq R+r$$

The reinforcing capillary 63 and the hole 77 are preferably in a concentric relationship with each other. However, optionally, they are in a slight excentrical relationship to each other to an extent such that the resultant reinforcing capillary can effect the desired reflection for the radiation mode light. Also, the cutting depth W from the terminal surface of the reinforcing capillary for forming the vacant portion 81 can be established as desired, and is preferably in the range of from 0.2 to 1 mm, so that both the easy of the cutting procedure and the mechanical strength of the resultant reinforcing capillary are satisfactory. Further, to remove the influence of reflection of the radiation mode light on the interface 74a between the reinforcing member 76 and the substrate plate 51, preferably the interface 74a is formed with an oblique angle of about 5 degrees with respect to the plane 47a which is normal to the optical waveguide output portion 47 and with an oblique angle of about 7 degrees with respect to the plane 78a which is normal to the longitudinal direction of the hole 77 of the reinforcing capillary 77.

On the radiation mode light-reflecting terminal surface portion 79 of the reinforcing capillary 63, a light reflective membrane is preferably formed by depositing a metal membrane, for example, gold, chromium or aluminum membrane or a dielectric multi-layered membrane, for example, formed from at least one $TiO_2$ layer and at least one $SiO_2$ layer alternately laminated on each other, to enhance the reflectance of the reflecting terminal surface.

The terminal surface of the reinforcing capillary optionally has a portion thereof formed into a curved surface projecting outward, to thereby enable the monitoring light passing through the reinforcing capillary to be reflected on the curved surface portion of the terminal surface, and to be converged into and received by the monitoring light receiving means.

As a photoelectric conversion element of the light receiving means, a photosemiconductor diode (PD) is preferably employed. In this case, the radiation mode light is received by the PD, the received light is converted to electric signal by the PD, and an electric signal is outputted from the PD.

Figure 12:
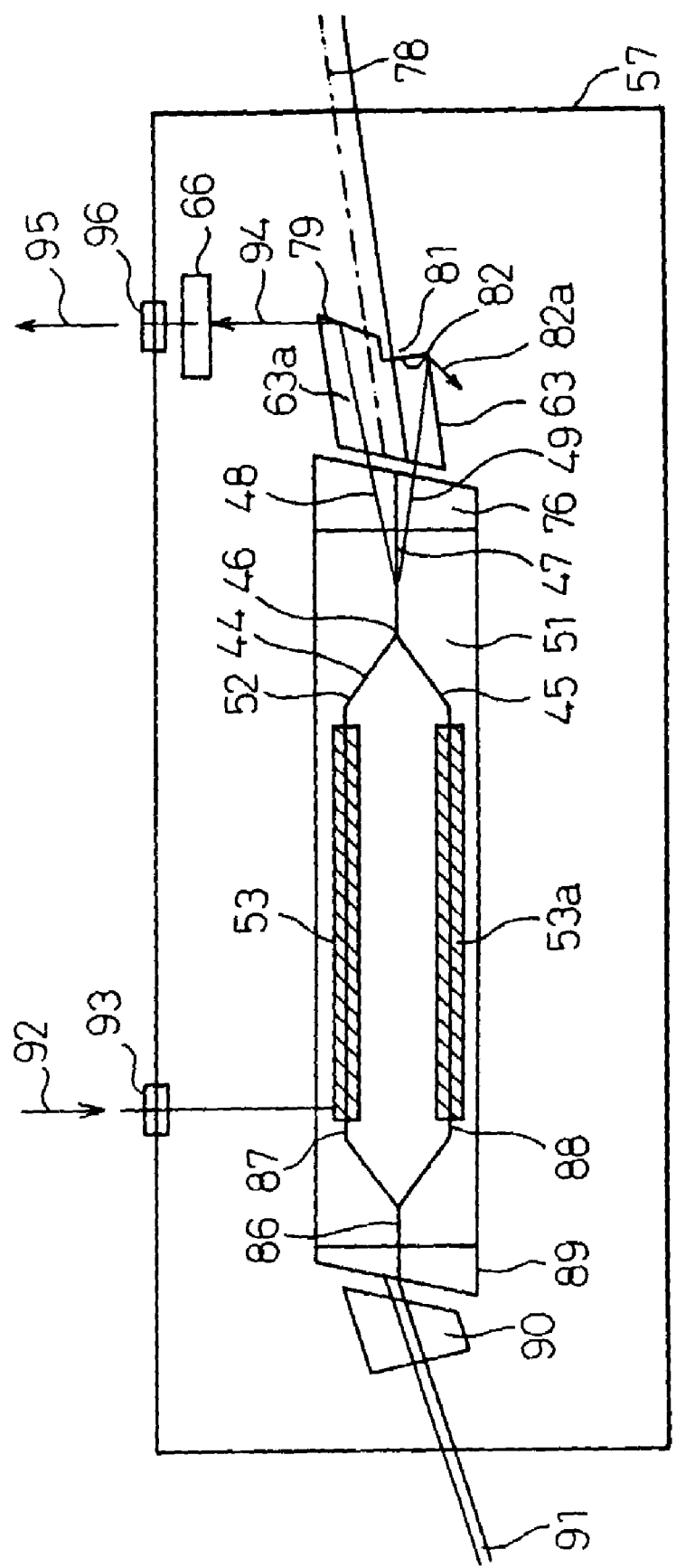
FIG. 12 is an explanatory plan view showing a constitution of another embodiment of the optical waveguide modulator equipped with an output light monitor of the present invention.

FIG. 12 shows another embodiment of the optical modulator of the present invention. In FIG. 12, a substrate plate 51 formed from a strong dielectric material, for example, LiNbO$_3$ is fixed in a box (case) 57, an optical waveguide 52 is formed in the surface portion of the substrate plate. The optical waveguide 52 has an optical waveguide input portion 86, branched portions 87 and 88 branched from the input portion 86, output portions 44 and 45 of the branched portions 87 and 88, connecting portion 46 of the branched portions, and output portion 47, and electrodes 53 and 53a are arranged on the branched portions 87 and 88. An input portion-reinforcing member 89 is arranged in the input end portion of the substrate plate 51, an input side capillary 90 is connected to the input end face of the substrate plate (however, in FIG. 12, the capillary 90 and input end face of the substrate plate 51 are spaced from each other), an input side optical fiber 91 is introduced into a hole (not shown in FIG. 12) of the reinforcing capillary 90, and an end face of the optical fiber 91 is connected to the input end face of the optical waveguide input portion 86.

The optical waveguide output portion 47 is connected to the output side reinforcing capillary 63 and the output side optional fiber 78, in the same manner as in FIG. 10.

When light is inputted into the optical waveguide input portion 86 through the input side optical fiber 91 reinforcing by the reinforcing member 90, the inputted light is distributed to the branched portions of 87 and 88, and an electric signal 92 is applied to the electrodes 53 and 53a through, for example, a connector 93 arranged on a side surface of the box 57, the optical phase of the light waves transmitting through the branched portions 87 and 88 varies in response to the applied signal, the light waves are incorporated to each other in the connecting portion 46, and interfere with each other to generate signal light. The signal light generated by the interference is outputted to the outside of the box 57 through the optical fiber 78 reinforced by the capillary 63.

In two portions 48 and 49 of the radiation mode light radiated at the connecting portion 46 to the two sides of the optical waveguide output portion for the output light in the substrate plate 51, the radiation mode light portion 48 is transmitted through the inside 63a of the capillary 63 and is reflected on the reflecting surface 79 formed in an upper half portion of the terminal surface of the capillary 63, the reflected light portion is converged on the cylindrical periphery of the capillary 63 and is radiated in a direction approximately at a right angle to the output portion 47 of the optical waveguide namely a direction substantially normal to the side surfaces of the box 57. The radiated light beam 94 is received by a light receiving surface of a light receiving means 66 (photoelectric conversion element, PD) arranged at an angle which is substantially normal to the light beam 94 and which does not allow a portion of the light beam reflected on the light receiving surface to return to the reflecting surface of the capillary, and fixed on the side surface of the box 57.

The received radiation mode light signal is converted to electric signal by the photoelectric conversion element, and the resultant electric signal 95 is outputted, as output light monitoring signal, to the outside of the box 57 through a connector 96.

The radiation mode light 49 radiated from the connecting portion 46 passes through the inside 63a of the capillary 63 and reaches the end face 82 of the vacant portion 81 formed in the lower half portion of the terminal portion of the capillary 63 and is reflected on the end face 82 in a direction in which the reflected light does not reach the light receiving means 66.

The monitoring function as mentioned above can be obtained by an optical element having, for example, a Mach-Zehnder type optical waveguide in which branched portions are incorporated with each other at a Y-shaped connection.

In the optical modulator of the present invention, the constitution of the non-monitoring half portion in the terminal surface of the light-output side reinforcing capillary so that a portion of the radiation mode light transmitted through the light-output side reinforcing capillary is not received by the photoelectric conversion element of the light-receiving means, is not limited to the embodiments as shown in FIGS. 10, 11 and 12. The non-monitoring half portion may be formed by a non-reflective surface for the radiation mode light, or the portion of the radiation mode light reflected on the non-monitoring half portion may be intercepted by a light-intercepting means arranged between the periphery of the capillary and the photoelectric conversion element, or a means for intercepting the portion of the radiation mode light transmitting through the inside of the capillary toward the non-monitoring half portion of the terminal surface, for example, a light-intercepting concavity or a light-intercepting plate, may be arranged or formed in the inside of the reinforcing capillary.

In FIGS. 10, 11 and 12, an embodiment of the optical modulator in which, to reduce the reflection of the radiation mode light on the end face of the substrate plate, the end face of the substrate plate is inclined at an angle of about 5 degrees in the surface direction (horizontal direction) of the substrate plate, from a plane normal to the extending direction of the optical waveguide output portion 47, is explained. In case where the end face of the substrate plate is inclined with respect to the surface of the substrate plate, the capillary is formed as shown in FIG. 13, to make the forming of the capillary easy.

Figure 13:
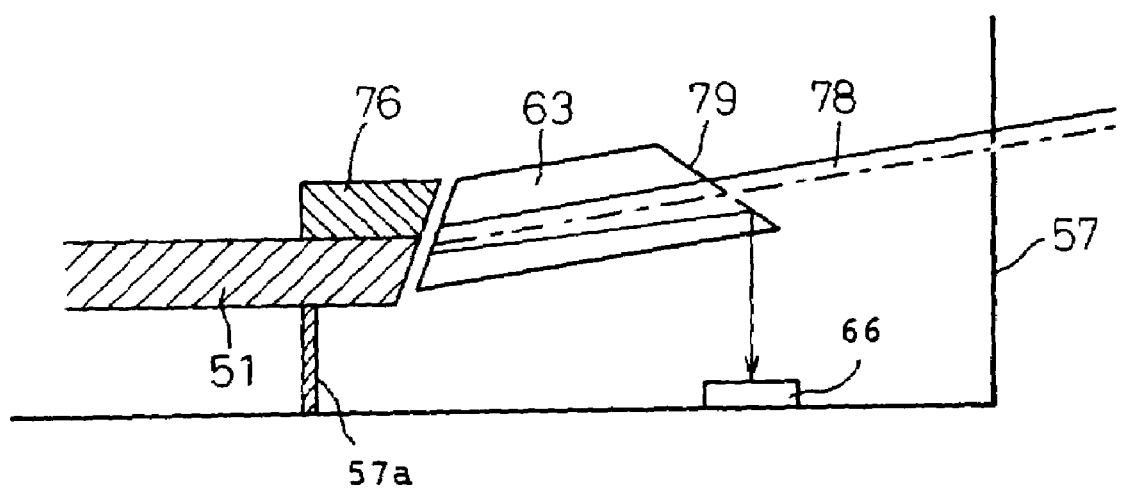
FIG. 13 is an explanatory side view showing a constitution of an important portion of still another embodiment of the optical waveguide modulator equipped with an output light monitor of the present invention.

In FIG. 13, a substrate plate 51 and a reinforcing member 76 for the substrate plate are arranged on a bottom surface of a box 57 and supported by a supporting member 57a, the output side end faces of the substrate plate and the reinforcing member is formed at an inclined angle from a plane normal to the surface of the substrate plate 51, and the inclined output side end face of the substrate plate 51 is connected to an end face of a reinforcing capillary 63 in such a manner that a longitudinal center line of a hole (not shown) of the reinforcing capillary is inclined at an angle of 42 to 48 degrees from the surface of the substrate plate. A terminal surface 79 of the reinforcing capillary 63 is imaginarily divided into two half parts (in this case, a right half part and a left half part) by a intersecting line of the terminal surface 79 with a plane parallel to a vertical plane including the longitudinal center line of the hole of the capillary 63, a half part of the terminal surface 79 is employed as a reflecting surface portion, and a portion of the radiation mode light reflected on the reflecting surface portion is converged by the cylindrical periphery of the capillary, and the converged light beam is received by a light-receiving surface of a photoelectric conversion element of the light receiving means 66 (arranged, for example, on the bottom surface of the box 57). The other half part of the terminal surface of the reinforcing capillary is a non-monitoring surface portion. A boundary line between the reflecting surface portion and the non-monitoring surface portion is preferably established in the same manner as shown in FIG. 11, and the non-monitoring surface portion may be established in a manner as mentioned above.

The optical waveguide modulator equipped with an output light monitor of the present invention, as shown in FIGS. 10 to 13, exhibits the following advantages.

(1) The constitution of the modulator is simple.

Namely, the form and constitution of the optical intensity modulator element and production method and technique of the element are the same as those of the conventional element having no monitor, and thus no new technology is necessary.

(2) The monitoring output light is transmitted through space and thus no light guiding optical fiber is necessary for the monitoring output light.

Thus, when the optical waveguide element is joined in the box, no connection of an optical fiber with a monitoring light-outputting optical waveguide and no connection of a light receiving element to an optical waveguide element, no circuit arrangement and no other specific operations are necessary. Also, the light receiving element and circuit thereof can be arranged in the box before the optical waveguide element is fixed in the box. Also, no specific design of the box for carrying out the above-mentioned operations is necessary.

(3) The monitoring light can be radiated in a desired direction. Accordingly, the light receiving element can be freely located in a desired position. Namely, the light receiving element can be located in any vacant portion of the box. No specific design of the box is necessary to locate the light receiving element in the box.

(4) Radiation mode light is utilized.

The radiation mode light which is usually wasted in the conventional optical intensity modulator, is utilized as monitoring light, and thus, not only does the optical waveguide element need no specifically designed portions such as branched portions for outputting the monitoring light, but also, no increase in transmission loss of light, which is important for the modulator, occurs.

Therefore, the conventional type of optical intensity modulator can be utilized in the present invention without modification, and no branched portions of the optical waveguide for the monitoring light and no lens for taking out the monitoring light is necessary.

(5) Disturbance variation in monitoring light output due to environmental weather is little or none and thus the monitoring can be precisely effected.

Namely, in the optical waveguide modulator equipped with an output light monitor of the present invention, the radiation mode light is utilized as monitoring light, and thus, a monitoring light-detecting means having a simple constitution can be easily arranged, and the variation in monitoring light output due to disturbance is little or none. Thus, the modulator of the present invention can be advantageously used in practice.

In embodiment (2) of the optical waveguide modulator equipped with an output light monitor, the optical waveguide of the optical waveguide element has a monitoring light-outputting optical waveguide portion connected to the waveguide-connection portion, in addition to the output light-outputting optical waveguide portion, to thereby output the monitoring light through the output end of the monitoring light-outputting optical waveguide portion.

In an example of embodiment (2) of the present invention, an end face of an optical fiber piece for outputting the monitoring light is connected to the outputting end of the monitoring light-outputting waveguide portion;

the optical fiber piece for outputting the monitoring light is held is a groove for the monitoring light, which groove is formed in the reinforcing capillary and is longer than the optical fiber piece for outputting the monitoring light; an end face of the groove for the monitoring light, facing the output end face of the optical fiber-piece for outputting the monitoring light constitutes a reflecting surface for the monitoring light, whereby the monitoring light outputted through the output end of optical fiber piece for outputting the monitoring light is reflected on the above-mentioned reflecting surface, and the reflected monitoring light is received, as an outputted monitoring light, by the monitoring light-receiving means.

Figure 14:
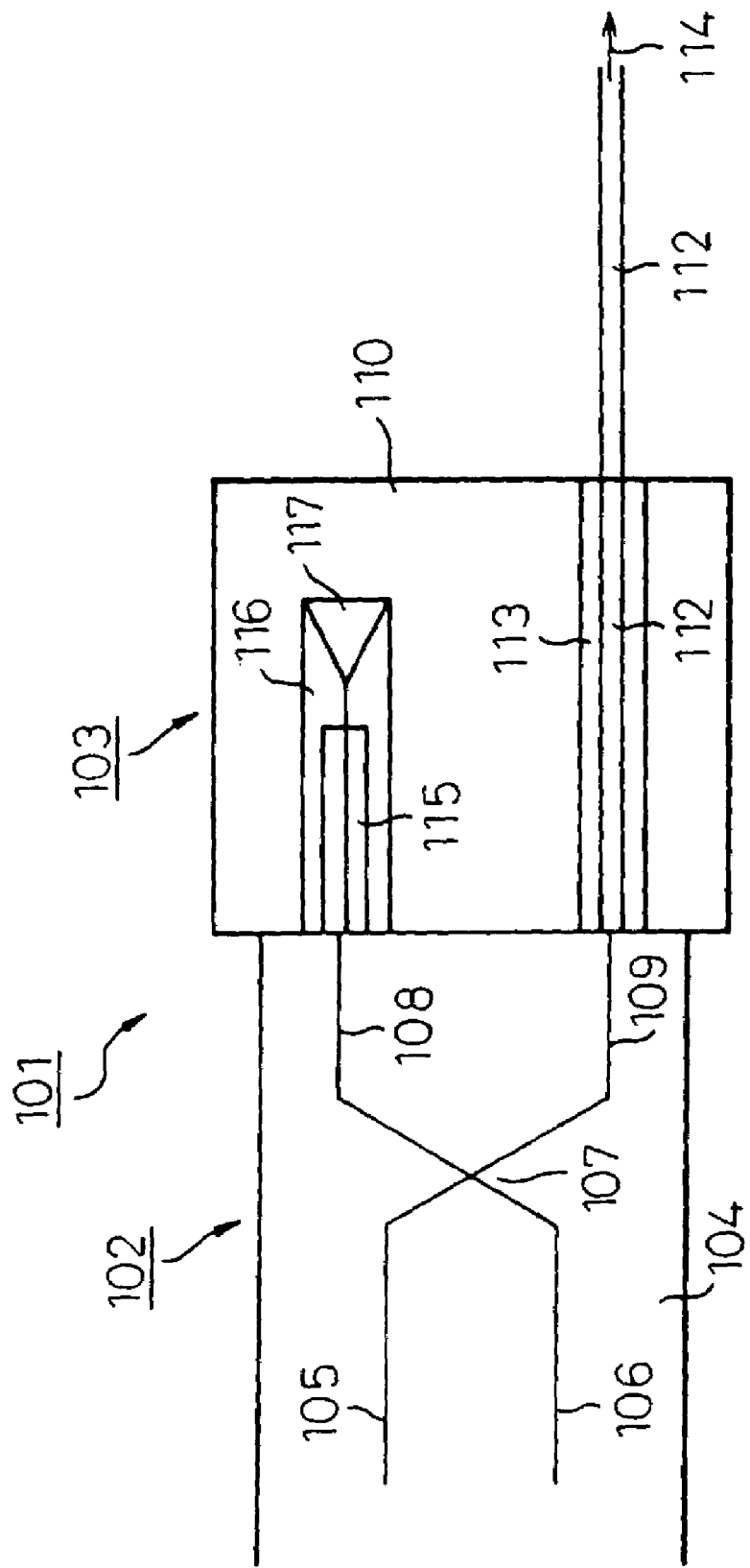
FIG. 14 is an explanatory plan view showing a constitution of an important portion of further another embodiment of the optical waveguide modulator equipped with an output light monitor of the present invention.
Figure 15:
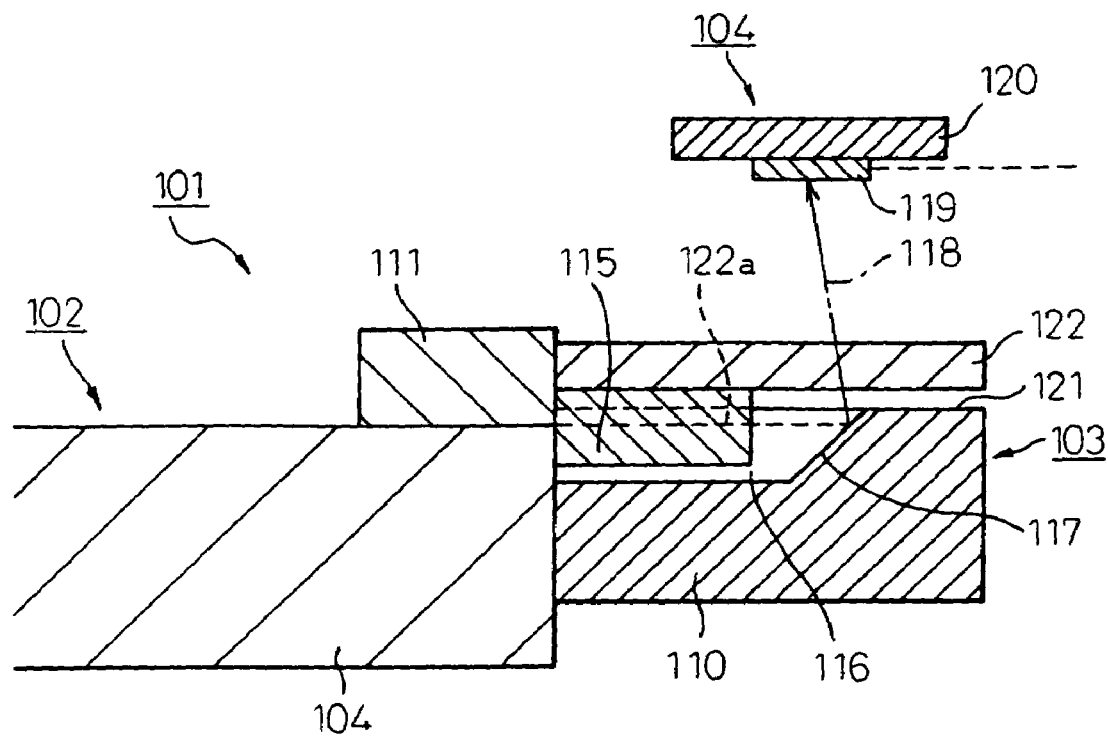
FIG. 15 is an explanatory partially cross-sectional front view showing a constitution of an important portion of the optical modulator of FIG. 14.

FIG. 14 shows an explanatory plan view of the optical waveguide modulator equipped with an output light monitor of embodiment (2) of the present invention. FIG. 15 shows an explanatory partially cross-sectional front view of the modulator of FIG. 14, and FIG. 15 is a graph showing examples of wave forms of main signal light and monitoring light outputted from the modulator of the present invention shown in FIGS. 14 and 15.

Figure 16:
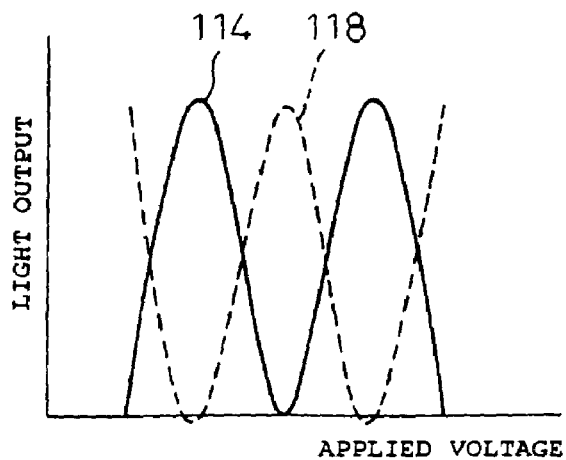
FIG. 16 is a graph showing wave forms of main output light and monitoring output light outputted from the optical modulator shown in FIGS. 14 and 15.

In FIGS. 14, 15 and 16, an optical waveguide modulator 101 has a modulator chip 102, a reinforcing capillary 103 and a monitoring light-receiving means 104. The modulator chip 102 has the same constitution as that of a modulator chip 102 shown in FIG. 15. In FIGS. 14 and 15, only a portion of the modulator chip 102 is shown.

In the modulator chip 102, a surface waveguide is formed in a surface portion of a substrate plate 104 consisting of a dielectric material (LN) or a semiconductor material (GaAs). The surface waveguide has a plurality of surface waveguide portions 105 and 106, a connection portion 107 in which the waveguide portions 105 and 106 are converged and connected to each other, a main output waveguide portion 108 and a monitoring light output waveguide portion 109. An optical fiber-supporting base plate 110 of the reinforcing capillary 103 is connected to an output side end face of the substrate plate 104. This connection is reinforced by a reinforcing member 111.

The main output waveguide portion 109 is connected to an end face of a main output optical fiber 112. The main output optical fiber 112 is supported in a main output V-shaped groove 113 formed in an optical fiber-supporting base plate 110 of the reinforcing capillary 103, the opposite end portion of the main output optical fiber 112 extend outward over the optical fiber-supporting base plate 110, whereby to output the main output light 114 transmitted through the main output optical fiber 112 to the outside of the modulator 101.

The V-shaped groove 113 has a pair of inclined side surfaces facing each other and extending along the longitudinal direction of the groove.

The monitoring light output waveguide portion 108 is connected to an end face of a monitoring light output optical fiber 115, and the monitoring light output optical fiber 115 is supported in a V-shaped groove 116 for the monitoring light, formed separately from the V-shaped groove for the main output light. The V-shaped groove 116 for the monitoring light has a pair of inclined side surfaces extending along the longitudinal direction thereof and facing each other and an inclined end surface 117 oblique with respect to the longitudinal axis of the groove 116, an end face of the monitoring light output optical fiber piece 115 faces the inclined end face 117, whereby the monitoring light 118 is radiated through the other end face of the monitoring output optical fiber piece 115 toward the inclined inside end surface 117. The radiated monitoring light 118 is reflected upward on the inclined end surface 117.

A monitoring light-receiving means 104 is located above the V-shaped group 116 for the monitoring light. The monitoring light-receiving means 104 includes a photoelectric conversion element (a photodiode (PD)) 119. The photoelectric conversion element 119 receives the monitoring light 118 reflected on the inclined end surface 117 of the V-shaped groove 116 for the monitoring light and converts the received light to an electric signal. The photoelectric conversion element 119 is supported by a supporting member 120.

The optical fiber-supporting base plate 110 is constituted from, for example, a Si single crystal, and the inclined side surfaces of the V-shaped groove 113 for the main output light and the inclined side surfaces and the inclined end surface of the V-shaped groove 116 for the monitoring light are formed by applying an anisotropic etching to the Si single crystal. In this etching, the plane <111> of the Si single crystal is selectively etched to form a V-shaped groove having an oblique angle of 54.7 degrees. The form and the top end width of the V-shaped groove can be certainly established by photolithography, and the top end of the V-shaped groove can be formed at a desired width.

As shown in FIG. 15, the upper portions of the peripheries of the optical fibers 112 and 115 supported in the V-shaped groove 113 for the main output light and the V-shaped groove 116 for the monitoring light preferably projects upward over the upper end face 121 of the optical fiber-supporting base plate 110, and the height of the projection is preferably 30 μm or more and ½ or less of the outside diameter of the optical fiber. In this projection height, a center line 122 of the optical fiber is located below the upper surface 121 of the optical fiber-supporting base plate 110. In the reinforcing capillary 103, a guard plate 122 is arranged on the optical fibers 112 and 115.

In view of the applied voltage-light output relationship shown in FIG. 16, it is clear that the wave form of main output light 114 and the wave form of the monitoring light 118 are in a supplementary relationship to each other, and the output conditions of the main output light 114 can be accurately detected by the monitoring light 118.

As FIG. 17 shows, the main output optical-fiber 112 and the monitoring light output optical fiber 115 supported respectively in the V-shaped grooves 113 and 116 of the optical fiber-supporting base plate 110 of the reinforcing capillary 103 are adhered to and fixed in the V-shaped grooves 113 and 116 by an adhesive 123, and are stabilized by a transparent guard plate 122 as shown in FIGS. 15 and 16. A reinforcing member 111 reinforces the connection between the dielectric base plate 104 of the modulator chip 102 and the optical fiber-supporting base plate 110.

In FIGS. 14 and 15, the monitoring light outputted through the monitoring light output waveguide portion 30 is radiated from the end face of the monitoring light output optical fiber 108 toward the inclined end surface 117 of the V-shaped groove 116 for the monitoring light, the radiated monitoring light is reflected upward on the inclined end surface 117, and the reflected monitoring light 118 passes through the guard plate 122 and is received by the photoelectric conversion element (photodiode, PD) 119 by which the received monitoring light is converted to electric signal. The electric signal is inputted, as input signal into the bias control circuit (not shown in FIGS. 14 and 15), as shown in FIG. 2, and the photoelectric conversion element for controlling the modulator may be fixed to the guard plate 122.

Figure 18A:
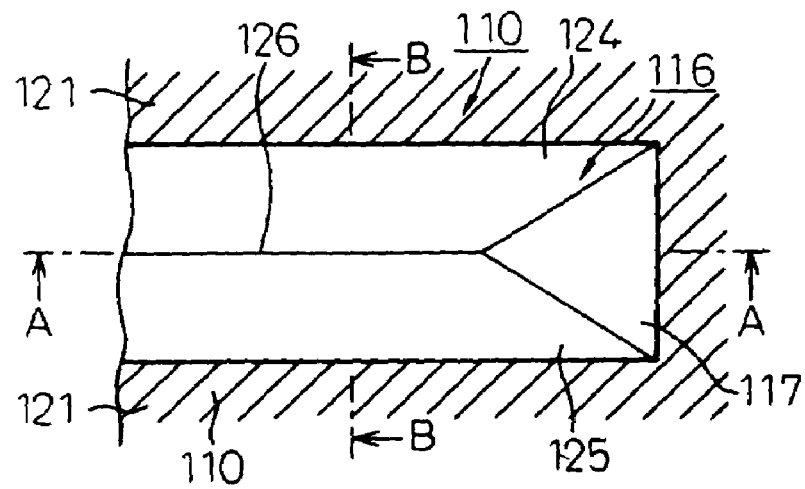
FIG. 18(A) is an explanatory plan view showing an example of the form of a monitoring V-shaped groove of the reinforcing capillary of the optical waveguide modulator equipped with an output light monitor of the present invention.
Figure 18B:
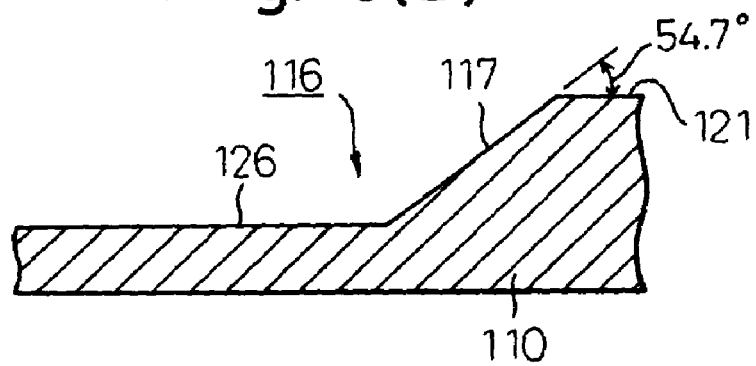
FIG. 18(B) is an explanatory cross-sectional front view of the monitoring V-shaped groove of FIG. 18(A).
Figure 18C:
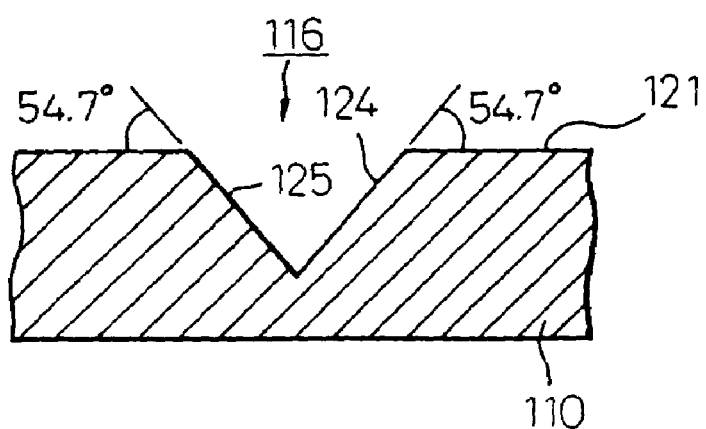
FIG. 18(C) is an explanatory cross-sectional side view of the monitoring V-shaped groove of FIG. 18(A).

In FIGS. 18(A), 18(B) and 18(C), examples of the V-shaped grooves for the monitoring light, formed from silicon are shown in detail. FIG. 18(A) is an explanatory partial plan view of the V-shaped groove 116, FIG. 18(B) is an explanatory cross-sectional view the V-shaped groove 116 along a line A-A of FIG. 18(A), and FIG. 18(C) is an explanatory cross-sectional view of the V-shaped groove along a line B-B, of FIG. 18(A).

In FIGS. 18(A), 18(B) and 18(C), a V-shaped groove 116 is formed by etching in an optical fiber-supporting base plate 110 and below the upper surface 121 of the base plate. The V-shaped groove 116 has side surfaces 124 and 125 intersecting each other at a bottom line 126. Also, the V-shaped groove 116 has an inclined end surface 117 at an oblique angle to the longitudinal axis of the groove.

Each of the side surfaces 124 and 125 and the inclined end surface of the groove is a formed by a <111> plane of a silicon single crystal and each have an oblique angle of 54.7 degrees to the upper surface 121.

The inclined end face 117 of the V-shaped groove 116 for the monitoring light is optionally coated with a high reflectional coating, for example, an Au membrane, to enhance the reflectance of the inclined end face. Preferably, to increase the reflected light amount, the depths of the V-shaped grooves 113 and 116 is established so that the longitudinal center line 122 of the monitoring light output optical fiber 115 is located below the level of the upper surface 121 of the optical fiber-supporting base plate 110. When the center line of the optical fiber 115 is located above the level of the upper surface 121, the monitoring light may be reflected in a decreased light volume on the inclined end face, and thus a disadvantage, that the reflected monitoring light is received in an insufficient light volume by the light receiving means, may occur.

For the purpose of arranging the main light output optical fiber 112 and the monitoring light output optical fiber 115 properly by using the guard plate 122, it is preferable that the upper portions of the peripheries of the optical fibers 112 and 115 project above the upper surface 121 of the optical fiber-supporting base plate 110 at a light of 30 μm or more but not more than ½ of the outer diameters of the optical fibers. Also, preferably, the depths of V-shaped grooves 116 and 113 be established so that the light of the projected upper portions of the peripheries of the optical fibers above the optical fiber-supporting base plate 121 is 30 μm or more but not more than ½ of the outer diameters of the optical fibers.

Figure 19A:
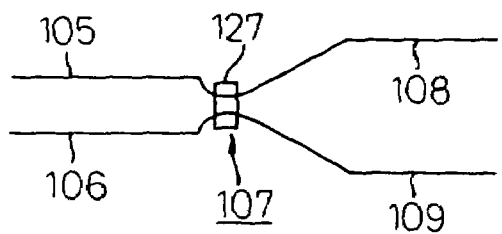
FIG. 19(A) is an explanatory plan view showing a constitution of an embodiment of the optical waveguide portion of the optical waveguide element of the optical waveguide modulator equipped with an output light monitor of the present invention.
Figure 19B:
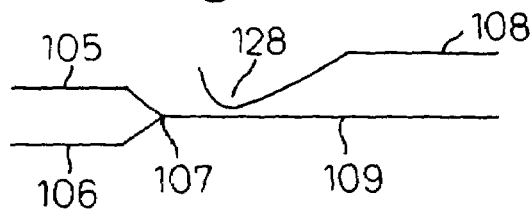
FIG. 19(B) is an explanatory plan view showing a constitution of another embodiment of the optical waveguide portion of the optical waveguide element of the optical waveguide modulator equipped with an output light monitor of the present invention.

In FIGS. 19(A) and 19(B), examples of constitutions of connecting portion of the optical waveguide 107 at which two output light waveguide portions, namely the main light output waveguide portion 109 and the monitoring output light waveguide portion 108, are converged thereinto and connected with each other, and then the main light-outputting waveguide portion 109 and the monitoring light-outputting waveguide portion 108 are separated from each other, are shown.

In FIG. 19(A), the waveguide connecting portion 107 is formed from an X coupler or a directional coupler 127.

When a 3 dB coupler is used as a directional coupler, the function of the resultant coupler is the same as the X-coupler. In FIG. 19(B), the main light-outputting waveguide portion 109 is connected to the waveguide connecting portion 107, a directional coupler 128 for TAP is arranged on a portion of the main light-outputting waveguide portion 109, to separate a portion of the output light and to provide a monitoring light-outputting waveguide portion 108.

The optical fiber piece 115 for the monitoring light usable for the present invention may be formed from a single mode fiber, and is preferable formed from a multi-mode fiber (for example, G150 or G162). When the multi-mode fiber is used, the alignment of the fiber is easy.

Figure 20A:
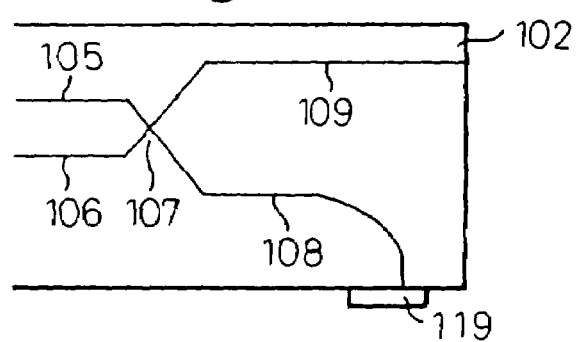
FIG. 20(A) is an explanatory plan view showing a constitution of an example of optical waveguides which are practically unworkable.
Figure 20B:
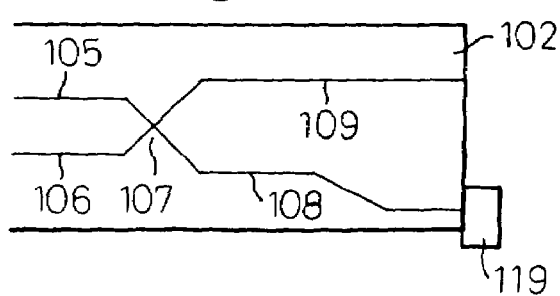
FIG. 20(B) is an explanatory plan view showing a constitution of another example of an optical waveguides which are practically unworkable.

Usually, the waveguide chip usable for the modulator of the present invention has a width of about 1 to 3 mm. Usually, since a maximum curvature of the waveguide at which the waveguide can be heat without being damaged is about 5000 mm, the bending of the monitoring light-outputting waveguide portion 108 as shown in FIGS. 20(A) and 20(B) to enable the monitoring light to be directly introduced into the photoelectric conversion element (PD) 119 is practically impossible.

In another example of the embodiment (2) of the optical waveguide modulator equipped with an output light monitor, an end face of the monitoring light-outputting optical fiber piece is connected to an output end of the monitoring light-outputting optical waveguide portion;

the monitoring light-outputting optical fiber piece is held in a hole or groove formed in the reinforcing capillary and is not longer than the monitoring light-outputting optical fiber;

the hole or groove for the monitoring light formed in the reinforcing capillary inclines in a manner such that the farther the hole or groove for the monitoring light from the connection surface waveguide element, the farther the hole or groove for the monitoring light from the hole or groove for the output light; and the output end face of the monitoring light-outputting optical fiber piece is directed to the monitoring light-receiving means, whereby the monitoring light outputted from the output end face of the monitoring light-outputting optical fiber piece is received by the monitoring light-receiving means.

Figure 21:
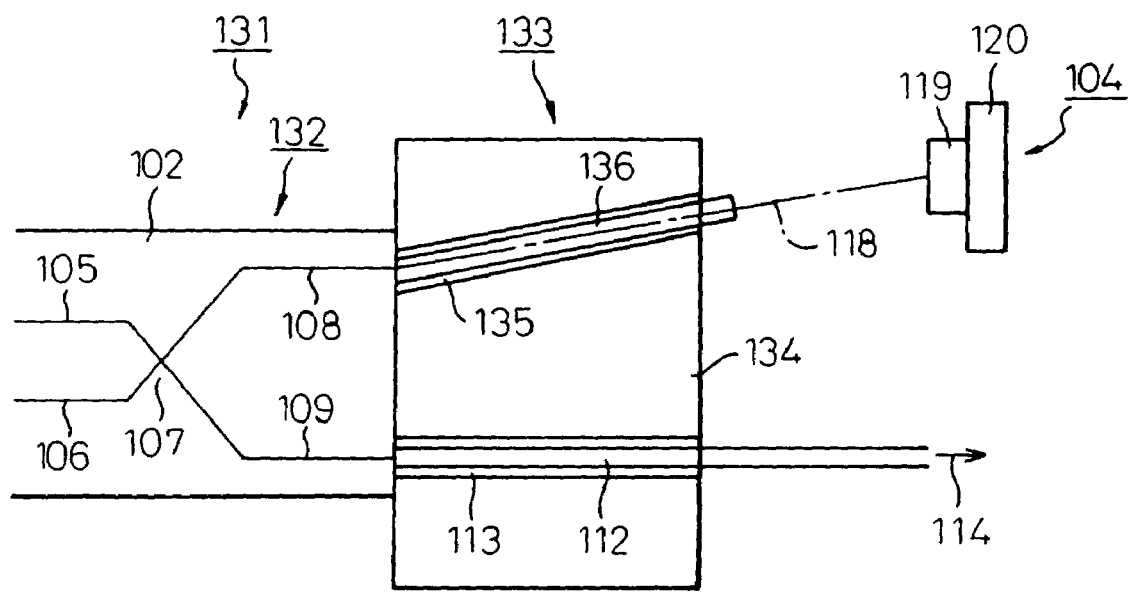
FIG. 21 is an explanatory plan view showing a constitution of an important portion of another embodiment of the optical waveguide modulator equipped with an output light monitor of the present invention.

A constitution of the above-mentioned example of the optical waveguide modulator of the present invention equipped with an output light monitor is shown in FIG. 21.

In the modulator 131 of FIG. 21, a waveguide chip 132 has the same constitution as that shown in FIGS. 14 and 15. In an optical fiber-supporting part 133, a V-shaped groove 113 for the main output light formed in an optical fiber-supporting base plate 134 and an optical fiber 113 for the main output light are the same as those shown in FIGS. 14 and 15. However, a V-shaped groove 135 for the monitoring output light formed or the optical fiber-supporting base plate 134 extends in an oblique angle at which the V-shaped groove for the monitoring light becomes more distant from the V-shaped groove 113 for the main output light, and an optical fiber piece 136 for the monitoring output light in the V-shaped grooves 135. The monitoring output light optical fiber piece 136 extends across the optical fiber-supporting part 133 and to the outside of the optical fiber-supporting base plate 134, and the end face of the optical fiber piece 136 faces a photoelectric conversion element 119 of the light receiving means 104. The monitoring light 118 outputted from the end face of the monitoring light output optical fiber 136 is received by the photoelectric conversion element 119 and is converted to an electric signal in this element. The photoelectric conversion element 119 is supported by a supporting member 120. In this modulator, the monitoring light-outputting optical fiber is preferably selected from multi-mode optical fibers, and an X coupler or a directional coupler is preferably arranged in the connecting portion of the surface waveguide. Alternatively, preferably, a main light outputting waveguide portion is connected to the connecting portion of the surface waveguide, and the monitoring light-outletting waveguide portion is connected to the main light-outpulling waveguide portion through a directional coupler. The length of the optical fiber piece 136 for the monitoring light output must be not shorter than the length of the V-shaped group 135 for the monitoring light output. The length of the optical fiber piece 136 may be equal to the length of the V-shaped group 135 and is preferably longer than the V-shaped groove 135, as shown in FIG. 21.

In the above-mentioned example of the embodiment (2) of the optical waveguide modulator of the present invention equipped with an output light monitor, as the main light outputting waveguide portion of the optical waveguide chip has a width of about 250 μm, and a portion of the optical fiber for the main output light located outside of the optical fiber-supporting base plate has an outside diameter of 250 to 400 μm light radiation from an end face of the modulator chip can be directly received by the photoelectric conversion element (PD) located in the modulator module, whereas in the conventional modulator, the direct receiving of the light radiation is difficult due to interference between the main output light waveguide and the main output light optical fiber. Thus, in the above-mentioned example of the embodiment (2) of the present invention, a optical waveguide modulator equipped with an output light monitor having little restriction in dimensions and form thereof, a high reliability, a low cost and a high utilizability in practice, can be provided.

In another example of the embodiment (2) of the optical waveguide modulator of the present invention equipped with an output light monitor, the monitoring light-outputting optical waveguide portion of the optical waveguide element is connected, together with the output light-outputting optical waveguide portion, to the waveguide-connection portion connected to the plurality of surface waveguide portions, through a directional coupler, a cross-coupler structure or a TAP coupler structure;

the output end of the output light-outputting optical waveguide portion is connected to an input end of an optical fiber inserted into the hole or groove of the reinforcing capillary;

the reinforcing capillary is formed from a light-transmitting material, to thereby enable the monitoring light outputted from the output end of the monitoring light outputting waveguide portion to transmit and permeate through the reinforcing capillary, to be reflected on the light-reflecting surface portion provided in the reinforcing capillary, and to be received by the monitoring light-receiving means; and the output end of the output light-outputting optical waveguide portion and the output end of the monitoring light-outputting optical waveguide portion are spaced from each other by a distance, the spacing distance being sufficiently large not to cause the monitoring light outputted from the monitoring light-outputting optical waveguide portion and transmitting through the reinforcing capillary to be affected by the output light outputted from the output end of the output light-outputting optical waveguide portion.

The light-transmitting material for the reinforcing capillary is preferably selected from silicon materials (for example, silicon single crystal), a transparent glass material (for example, quartz glasses or boro-silicate glasses) and a transparent ceramic material.

In the above-mentioned modulator, preferably, the terminal surface of the reinforcing capillary is provided with a light-reflecting surface portion which intersects an optical axis of the monitoring light-outputting optical waveguide portion at an oblique angle, to thereby enable the monitoring light outputted from the output end of the monitoring light-outputting optical waveguide portion and transmitted through the reinforcing capillary to be reflected on the above-mentioned light-reflecting surface portion toward the monitoring light-receiving means.

Also, in the modulator, the terminal surface of the reinforcing capillary is optionally provided with a curved surface portion projecting outward, to thereby enable the monitoring light transmitted through the reinforcing capillary to be reflected and converged on the above-mentioned curved surface portion and to be received by the monitoring light-receiving means.

Further, in the modulation, at least a region of the portion of the terminal surface of the reinforcing capillary, which non-monitoring portion does not contribute to transmitting and outputting the monitoring light directed to the monitoring light-receiving means, is optionally cut off.

Further, in the above-mentioned modulator, optionally, the light-reflecting surface portion of the terminal surface of the reinforcing capillary intersects the longitudinal axis of the hole for containing therein the output light-outputting optical fiber at an oblique angle, to thereby enable the radiation mode light reflected on the light reflecting surface portion to be received, as monitoring light, by the monitoring light-receiving means.

The reinforcing capillary is preferably in the form a cylinder. In this case, the light-reflecting surface of the cylindrical reinforcing capillary enables the radiation mode light reflected on the light-reflecting surface to transmit through the cylindrical reinforcing capillary and to be outputted, as monitoring light, through the peripheral surface of the cylindrical reinforcing capillary, while the monitoring light is converged by the lens effect of the periphery of the cylindrical reinforcing capillary, and the converged monitoring light to be received by the monitoring light-receiving means.

As explained in referring to FIG. 11, preferably, in the terminal surface of the reinforcing capillary, a boundary line between the light-reflecting surface portion and the non-monitoring surface portion is located between a transmitting path of a portion of the radiation mode light forwarding to the light-reflecting surface portion and another transmitting path of another portion of the radiation mode light forwarding to the non-monitoring surface portion, and the boundary line is positioned between a center line of the terminal surface of the reinforcing capillary intersecting the longitudinal axis of the hole and extending in the same direction as that of the boundary line, and a tangential line extending in parallel to the center line and coming into contact with a portion of a periphery line of the hole of the reinforcing capillary from which portion of the periphery line, the light-reflecting surface portion is formed.

Also, optionally, the non-monitoring surface portion of the terminal surface of the reinforcing capillary is one formed in a manner such that a portion of the reinforcing capillary is cut off inward from the terminal surface of the capillary, while another portion of the reinforcing capillary having the light-reflecting surface portion of the terminal surface thereof is not cut off.

Further, optionally, the non-monitoring surface portion of the terminal surface of the reinforcing capillary is a non-light reflecting surface not capable of reflecting the radiation mode light and, with respect to the non-monitoring surface portion of the terminal surface of the reinforcing capillary, a means for intercepting the radiation mode light reflected on the non-monitoring surface portion is arranged between the non-monitoring surface portion and the monitoring light-receiving means.

Figure 22:
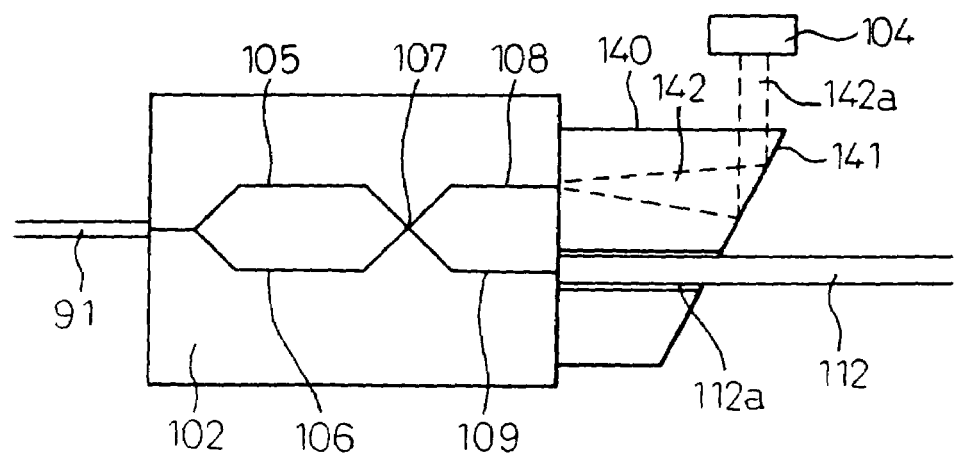
FIG. 22 is an explanatory plan view showing a constitution of an important portion of still another embodiment of the optical waveguide modulator equipped with an output light monitor of the present invention.

Referring to FIG. 22, the constitution of the above-mentioned embodiment of the optical waveguide modulator of the present invention equipped with an output light-monitor will be explained below.

In FIG. 22, an optical waveguide having a plurality of surface optical waveguide portions 105 and 106 is formed on a dielectric substrate plate 102, an input side end face of the waveguide is connected to an input side optical fiber 91. The plurality (two in FIG. 22) of surface waveguide portions 105 and 106 are connected to each other at a connecting portion 107, and an output end of the main output light waveguide portion 109 connected to the connecting portion 107 is connected to an output side optical fiber 112. To reinforce the connection of the output end of the main output light waveguide portion 109 to the output side optical fiber 112, a reinforcing capillary 140 is connected to the substrate plate 102 and the main output light waveguide portion 109. This reinforcing capillary 140 has a hole 112a through which the output side optical fiber 112 is inserted.

In an optical element, for example, an optical modulator having the Mach-Zehnder type optical waveguide provided with the above-mentioned constitution and capable of obtaining ON/OFF signals, the radiation mode light (monitoring light) 142 which is generated in an OFF mode condition, namely in a condition in which no optical signal is outputted, is irradiated from around a connecting portion of the surface waveguides into the substrate plate at an oblique outward direction with respect to the output light waveguide through which an optical signal output is waveguided. Usually, the radiation mode light (monitoring light) 142 transmits through the substrate plate and is finally irradiated from the end face of the base plate toward the outside of the base plate. The light amount of the radiation mode light (monitoring light) 142 is in a supplementary relationship to the light volume of the optical signal output light transmitting through the output light waveguide, and therefore, the optical signal output can be monitored by detecting the radiation mode light (monitoring light) 142.

The optical fiber 112 is connected to the end face of the substrate plate of the optical modulator to receive the optical signal output from the optical waveguide and to guide the received light to the outside of the modulator. The optical fiber has a very small thickness of 125 μm, and thus when the optical fiber is simply bonded to the end face of the substrate plate, the resultant bonding strength is insufficient. The connection of the optical fiber 112 to the optical waveguide 109 can be reinforced and protected by covering the optical fiber 112 by using a fiber-reinforcing capillary 140, and by bonding an end face of the reinforcing capillary 140' to the end face of the substrate plate 102, to enhance the bonding strength. Generally, the reinforcing capillary is made from a silicon material or a ceramic material. In this case, when the reinforcing capillary is made from a material through which the signal light/radiation mode light (monitoring light) can transmit, into dimensions in which the resultant capillary can receive the radiation mode light (monitoring light) irradiated from the end face of the substrate plate, the monitoring light 142 can be introduced into the reinforcing capillary.

When a terminal surface 141 of the reinforcing capillary (namely a terminal surface opposite to a connection end surface of the optical fiber reinforcing member to which surface the output end face of the optical waveguide element is bonded) is formed so as to intersect an optical axis of the above-mentioned output light waveguide portion of 109 at an oblique angle, as shown in FIG. 22, on the oblique terminal surface 141, the monitoring light 142 transmitted through the reinforcing capillary 140 is reflected, and the reflected monitoring light is delivered to the outside of the reinforcing capillary 140 (in a direction different from the direction in which the output light optical fiber extends, namely, in any of the upward rightward downward or leftward directions). The delivered light is received by a light-receiving means, for example, a photodiode (PD) 104, arranged separately from the optical waveguide element, to measure the amount of the monitoring light, and the amount of the main output light outputted from the optical waveguide can be monitored based on the measured monitoring light volume.

In the above-mentioned modulator system, however, the radiation mode light is inputted together with light come from the input side optical fiber into the substrate plate and light scattered in the waveguide and come to the substrate plate, into the light-receiving means, and therefore, a problem such that an extinction ratio in the monitoring light output is deteriorated, occurs.

The term "extinction ratio" is defined, when an ON/OFF signal is outputted from an optical element, for example, an optical modulator, as a ratio of a highest monitoring output to a lowest monitoring output.

Figure 23:
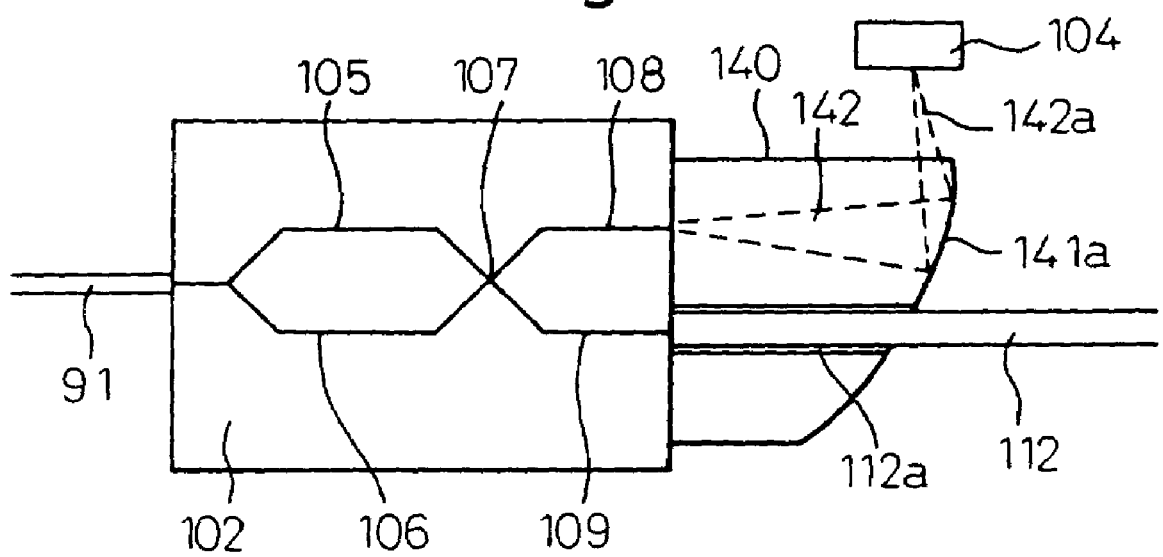
FIG. 23 is an explanatory plan view showing a constitution of an important portion of further another embodiment of the optical waveguide modulator equipped with an output light monitor of the present invention.

Referring to FIG. 22, at the connecting portion 107 of a plurality of surface waveguide portions 105 and 106 formed on the substrate plate 102, a monitoring light-outputting waveguide portion 108 branched from the main light-outputting waveguide portion 119 is formed, and the output end faces of the waveguide portions 108 and 109 are connected to the reinforcing capillary 140 having a size sufficient to receiving the monitoring light. The monitoring light outputted from the output end face of the monitoring light waveguide portion 18 transmits through the reinforcing capillary 140, and thus the monitoring light should be conducted to the light-receiving means 104. For example, as FIG. 22 shows, the monitoring light 142 is reflected on the terminal reflecting surface 141 of the reinforcing capillary 140, and then received by the light-receiving means 104. The oblique intersecting angle between the terminal reflecting surface 141 and the optical axis of the monitoring light waveguide portion 108 may be established so that the output light 142a of the reflected monitoring light can be received by the light receiving means 104. Also, optionally, the terminal reflecting surface is formed into a curved surface projecting outward as shown in FIG. 23, and the monitoring light 142a reflected on the curved reflecting surface 141a is converged and received by the light receiving means 104. Also, optionally the terminal reflecting surface is covered by a high reflectance membrane, for example, an Au or a Pt reflectance membrane adhered thereto.

In the modulator of the present invention, the monitoring light transmitted through the reinforcing capillary 140 may pass through the terminal surface of the reinforcing capillary, without being reflecting, may be outputted and then may be received by the light receiving means.

In the modulator of the present invention as shown in FIGS. 22 and 23, the distance between the output end of the main light-outputting waveguide portion and the output end of the monitoring light-outputting waveguide portion is preferably established so that the monitoring light 42 outputted from the monitoring light-outputting waveguide portion and transmitting through the reinforcing capillary and the main output light outputted from the output end of the main light-outputting waveguide portion 109 are not affected by each other. More preferably, the distance between the center axes of the light bundles of the monitoring light and the main light is equal to or more than a radius of the output side optical fiber 112, for example, when the optical fiber is a single mode optical fiber, the distance is 62.5 µm or more.

In FIGS. 22 and 23, the monitoring light outputted from the output end of the monitoring light-outputting waveguide portion 108 passes through the reinforcing capillary 140, is reflected on the terminal surface 141 or the terminal curved surface 141a of the reinforcing capillary 140, and the reflected monitoring light 142a is received by the light receiving means 104. In this case, the light bundle of the monitoring light introduced into the reinforcing capillary 140 transmit through only a portion of the reinforcing capillary 140. The transmitting path of the monitoring light is spaced from the transmitting path of the main output light outputted from the output end of the main light-outputting waveguide portion 109, and the monitoring light and the main outlet light are not affected by each other.

Figure 24A:
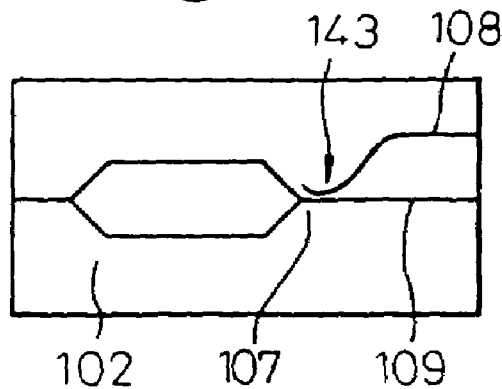
FIG. 24(A) is an explanatory plan view showing an example of the connection system between an output light waveguide portion and a monitoring light waveguide portion in the connection portion of a plurality of surface waveguide portions with each other, in the optical waveguide element of the optical waveguide modulator equipped with an output light monitor of the present invention.
Figure 24B:
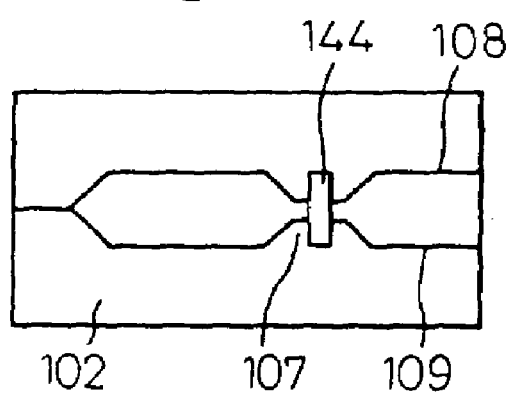
FIG. 24(B) is an explanatory plan view showing another example of the connection system between an output light waveguide portion and a monitoring light waveguide portion in the connection portion of a plurality of surface waveguide portions with each other, in the optical waveguide element of the optical waveguide modulator equipped with an output light monitor of the present invention.
Figure 24C:
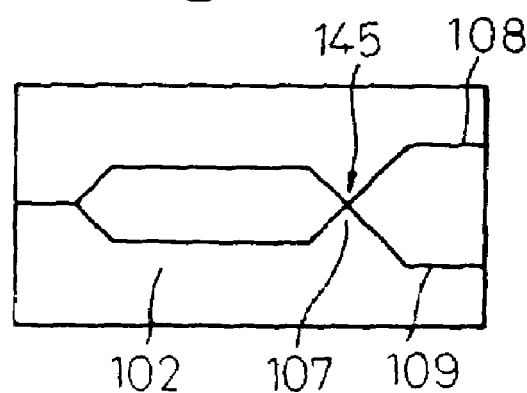
FIG. 24(C) is an explanatory plan view showing still another example of the connection system between an output light waveguide portion and a monitoring light waveguide portion in the connection portion of a plurality of surface waveguide portions with each other, in the optical waveguide element of the optical waveguide modulator equipped with an output light monitor of the present invention.

At the connecting portion of a plurality of surface waveguide portions of the modulator of the present invention, the connection of a main light-outputting waveguide portion to a monitoring light-outputting waveguide portion may be effected by the manners, for example, shown in FIG. 24(A) to FIG. 24(C). In FIG. 24(A), a monitoring light-outputting waveguide portion 106 is connected to a main light-outputting waveguide portion 109 through a TAP coupler structure 143. In this case, a portion of the main signal light is outputted as monitoring light into the reinforcing capillary 140 through a monitoring light-outputting waveguide portion 108. In FIG. 24(B), a directional coupler 144 is arranged in the connecting portion 107, and in FIG. 24(C), the connecting portion 107 is formed into a cross-coupler structure 145. In the cases of FIGS. 24(B) and (C), radiation mode light generated in the connecting portion 107 is outputted as monitoring light into the reinforcing capillary through the monitoring light-outputting waveguide portions.

Figure 25:
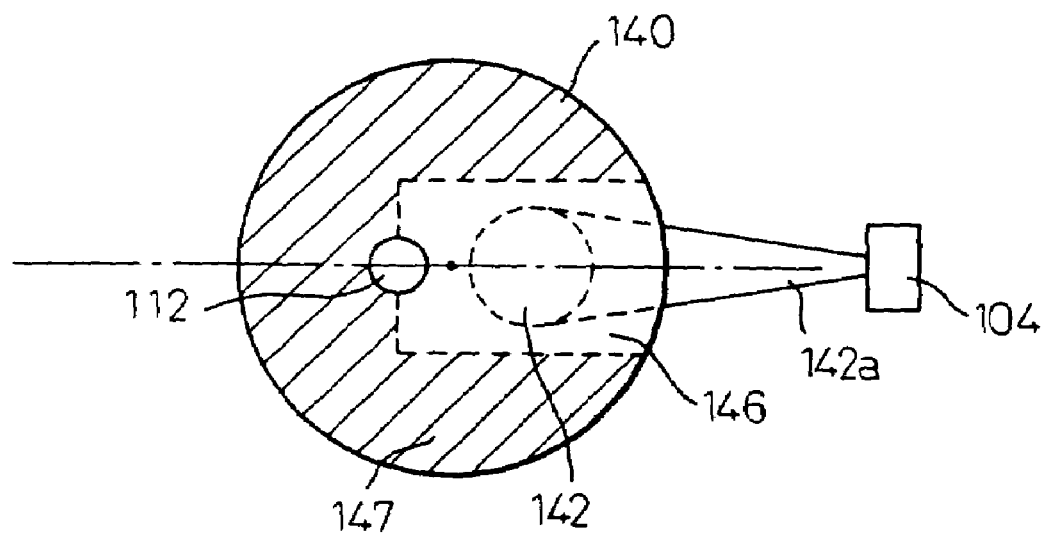
FIG. 25 is an explanatory side view of a terminal portion of an embodiment of the reinforcing capillary of the optical waveguide modulator equipped with an output light monitor of the present invention.

In a modulator of the present invention as shown in FIG. 25, the reinforcing capillary 140 should be provided with a region, namely an effective region 146, which enables the monitoring light 142 outputted from the monitoring light-outputting waveguide portion 108 to transmit through the reinforcing capillary 140, to be outputted through the terminal surface 141 or 141a thereof toward the light receiving means 104, and to support an optical fiber thereby. The other region 147 which does not contribute to transmitting and outputting of the monitoring light may be cut-off as long as the optical fiber 112 can be supported without hindrance.

Figure 26:
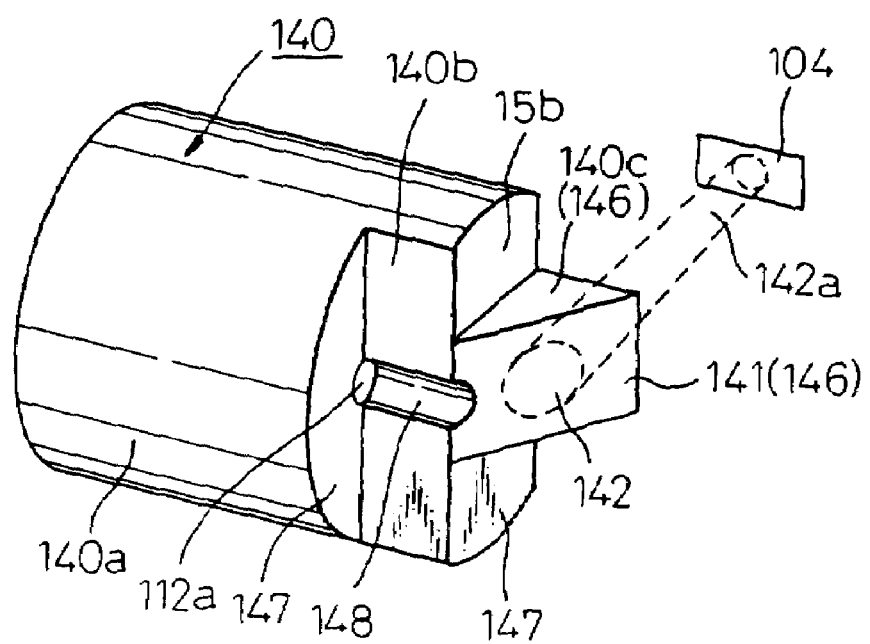
FIG. 26 is an explanatory schematic view showing a form of the reinforcing capillary of the optical waveguide modulator equipped with an output light monitor of the present invention.

For example, as shown in FIG. 26, the reinforcing capillary 140 has a connection portion 140a thereof connected to the optical waveguide element and in the form of a cylinder, and the connection portion 140a has a hole 112a for inserting an optical fiber (not shown in FIG. 26) therethrough. In FIG. 26, in a middle portion 140b continued from the connection portion 140a, a left half portion with respect to the center axis of the hole 112a is cut-off, so that a groove 148 continuing from the hole 112a is formed in the middle portion 140b. In the groove 148, the optical fiber (not shown in FIG. 26) is continued and supported. In a terminal portion 140c of the reinforcing capillary 140 continued from the middle portion 140b and having a terminal reflecting surface 141 formed on the terminal face thereof, an effective portion 146 thereof in which the transmitting path and the reflecting surface for the monitoring light is ensured remains and the other portion 147 is cut-off.

As FIGS. 25 and 26 show, by cutting-off the portion 147 of the reinforcing capillary which does not contribute to transmitting the monitoring light therethrough and to outputting the monitoring light therethrough, and to supporting the optical fiber therein, various advantages in that an undesired receipt of unnecessary light, for example, leaked light due to incomplete connection between the optical fiber and the optical waveguide and scattering light generated in the optical waveguide can be prevented and the extinction ratio of the monitoring light can be increased, can be realized.

Figure 27:
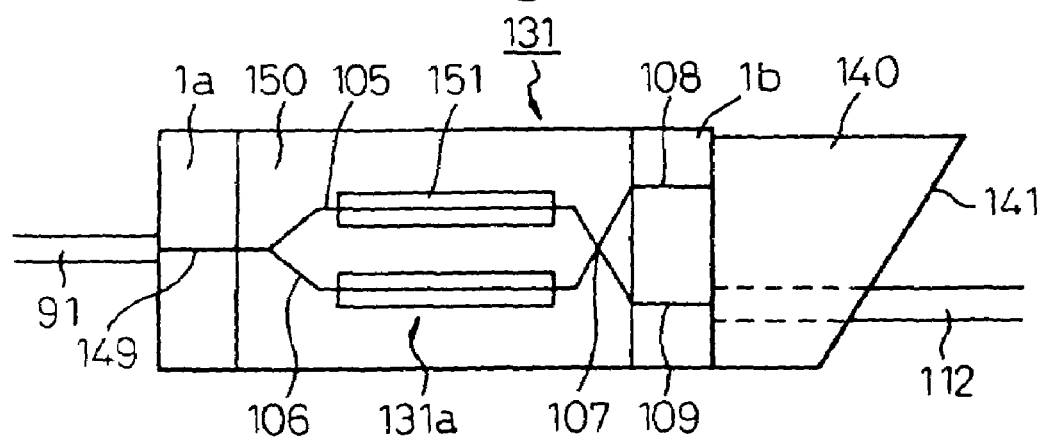
FIG. 27 is an explanatory plan view of another embodiment of the optical waveguide modulator equipped with an output light monitor of the present invention.
Figure 28:
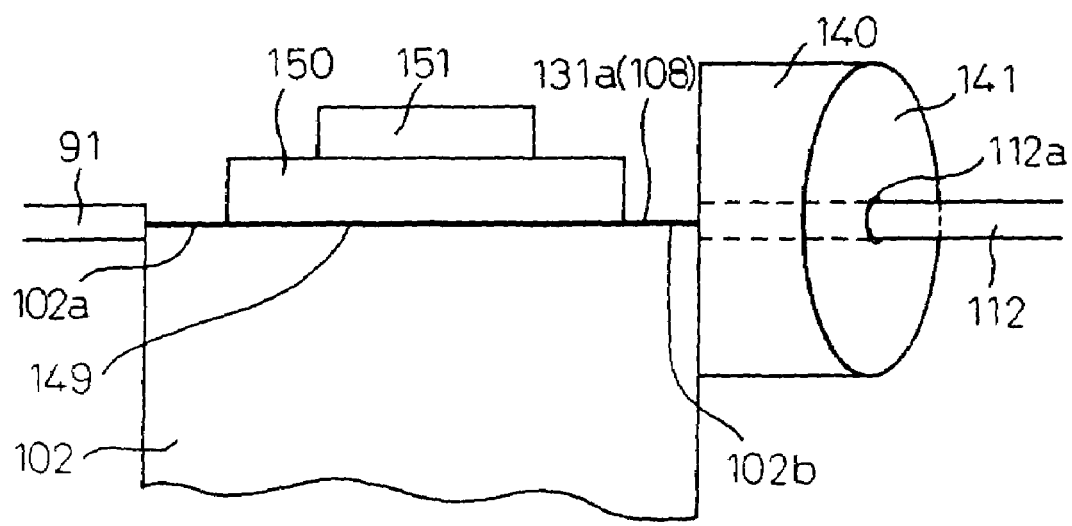
FIG. 28 is an explanatory front view of the optical waveguide modulator equipped with an output light monitor shown in FIG. 27.

In the modulator as shown in FIGS. 27 and 28, an optical waveguide 131a formed on a substrate plate 102 of an optical waveguide element 131 comprises an input light waveguide portion 149, surface waveguide portion 105 and 106, a connecting portion 107, a main light-outputting waveguide portion 108 and a monitoring light-outputting waveguide portion 109, and a $SiO_2$ 150 is formed on the optical waveguide 131a. However, no $SiO_2$ layer 150 is formed on the substrate surface portions 102a and 102b on which the input light waveguide portion 149 and the main light and monitoring light-outputting waveguide portions 109 and 108 are formed. Namely, the $SiO_2$ layer 150 is not formed on portions close to the input end and to the output end of the optical waveguide 131a. By forming the $SiO_2$ layer 150 in the manner as mentioned above, undesired inputting of light leaked from the $SiO_2$ layer into the reinforcing capillary can be prevented, and the extinction ratio of the monitoring light can be increased.

In the optical waveguide element, electrodes 151 are arranged on a plurality of surface waveguide portions 105 and 106 through the $SiO_2$ layer. The intensity of the light waves transmitting through the surface waveguide portions 105 and 106 can be desirably modulated by controlling the potential difference applied to the electrodes 151.

The optical waveguide element equipped with an output light monitor, of the above-mentioned embodiment of the present invention, enables the monitoring light generated in the connecting portion of the optical waveguide to be received by the light receiving means with a high efficiency at an extinction ratio similar to that of the main output light without affecting the main output light and the monitoring light each other.

INDUSTRIAL APPLICABILITY

The optical waveguide modulator equipped with an output light monitor of the present invention enables monitoring light to be transmitted to a means for receiving and detecting the monitoring light to monitor the intensity of the outputted monitoring light in a simple constitution thereof, and the intensity of the main output light to be controlled in response to the detecting results of the monitoring light.

What is claimed is:

1. An optical waveguide modulator, equipped with an output light monitor, comprising:
   an optical waveguide element comprising a dielectric substrate and an optical waveguide formed on a front surface of the dielectric substrate, the optical waveguide comprising a plurality of surface optical waveguide portions, an optical waveguide connecting portion on which the surface optical waveguide portions are converged and connected to each other, and an output light-outputting optical waveguide portion connected to the optical waveguide-connecting portion;
   an optical fiber for output light, connected to an output end of the output light-outputting optical waveguide portion;
   a reinforcing capillary for reinforcing a connection between the optical waveguide element and the output light-outputting optical fiber; and
   means for receiving monitoring light,
   wherein
   (1) the optical waveguide further comprises a monitoring light-outputting optical waveguide portion connected to the waveguide-connecting portion to output the monitoring light through the output end of the monitoring light-outputting optical waveguide portion;
   (2) the monitoring light-outputting optical waveguide portion is coupled to the waveguide-connection portion connected to the plurality of surface waveguide portions, through a directional coupler, a cross-coupler structure, or a tap coupler structure;
   (3) the reinforcing capillary is provided with a hole or groove formed therein for containing and holding the optical fiber for output light, a connection surface thereof connected to an output end side surface of the dielectric substrate, and a terminal surface thereof opposite to the connection surface, the terminal surface including a light-reflecting surface portion thereof;
   (4) the output end of the output light-outputting optical waveguide portion is connected to an input end of an optical fiber inserted into the hole or groove of the reinforcing capillary;
   (5) the reinforcing capillary is formed from transparent glass and configured to enable the monitoring light outputted from the output end of the monitoring light outputting waveguide portion to transmit and permeate from the connection surface to the terminal surface through the reinforcing capillary, to be reflected on the light-reflecting surface portion provided in the terminal surface of the reinforcing capillary, and to be received by the monitoring light-receiving means;
   (6) the output end of the output light-outputting optical waveguide portion and the output end of the monitoring light-outputting optical waveguide portion are spaced from each other at a distance, the distance being sufficiently large not to cause the monitoring light outputted from the monitoring light-outputting optical waveguide portion and passing through the reinforcing capillary to be affected by the output light outputted from the output end of the output light-outputting optical waveguide portion;
   (7) the light-reflecting surface portion of the terminal surface of the reinforcing capillary intersects an optical axis of the monitoring light-outputting optical waveguide portion at an oblique angle, to enable the monitoring light outputted from the output end of the monitoring light-outputting optical waveguide portion and transmitted through the reinforcing capillary to be reflected on the light-reflecting surface portion toward the monitoring light-receiving means, and
   (8) the monitoring light-receiving means is located in a position in which the monitoring light outputted from the reinforcing capillary to the outside of the capillary can be received, and is provided with a photoelectric conversion element.

2. The optical waveguide modulator equipped with an output light monitor as claimed in claim 1, wherein the terminal surface of the reinforcing capillary is provided with a curved surface portion projecting outward to enable the monitoring light transmitted through the reinforcing capillary to be reflected and converged on the curved surface portion and to be received by the monitoring light-receiving means.

3. The optical waveguide modulator equipped with an output light monitor as claimed in claim 1, wherein the light-reflecting surface portion of the terminal surface of the reinforcing capillary intersects the longitudinal axis of the hole or groove for containing therein the output light-outputting optical fiber at an oblique angle.

4. The optical waveguide modulator equipped with an output light monitor as claimed in claim 1, wherein the reinforcing capillary is in a form of a cylinder, and the light-reflecting surface of the cylindrical reinforcing capillary enables the monitoring light reflected on the light-reflecting surface to pass through the cylindrical reinforcing capillary and to be outputted, through the peripheral surface of the cylindrical reinforcing capillary, while the monitoring light is converged by the lens effect of the periphery of the cylindrical reinforcing capillary, and the converged monitoring light is received by the monitoring light-receiving means.

5. The optical waveguide modulator equipped with an output light monitor as claimed in claim 1, wherein at least a region of the terminal surface portion of the reinforcing capillary, which does not contribute to transmitting and outputting the monitoring light directed to the monitoring light-receiving means, is cut off.

6. The optical waveguide modulator equipped with an output light monitor as claimed in claim 1, wherein the non-monitoring surface portion of the terminal surface of the reinforcing capillary is a non-reflecting surface.

7. The optical waveguide modulator equipped with an output light monitor as claimed in claim 1, further comprising means arranged between the non-monitoring surface portion and the monitoring light-receiving means for intercepting the monitoring light reflected on the non-monitoring surface portion.

8. The optical waveguide modulator equipped with an output light monitor as claimed in any one of claims 1 to 7, wherein the optical waveguide element has a $SiO_2$ layer formed on a portion of the optical waveguide other than an input end portion of the surface optical waveguide portion and the output end portions of the output light-outputting optical waveguide portion and the monitoring light-outputting optical waveguide portion.

* * * * *